US008657687B2

(12) United States Patent
Anderson et al.

(10) Patent No.: US 8,657,687 B2
(45) **Date of Patent: *Feb. 25, 2014**

(54) PRESENTING AND CONTROLLING WAGERING GAME MARKETING INFORMATION

(75) Inventors: Peter R. Anderson, Glenview, IL (US); Brian J. Barclay, Atlanta, GA (US); Allon G. Englman, Chicago, IL (US); Andrew C. Guinn, Chicago, IL (US); Daniel P. Louie, Chicago, IL (US); Brian D. Manning, Las Vegas, NV (US); Larry J. Pacey, Northbrook, IL (US); Richard T. Schwartz, Deerfield, IL (US); Alfred Thomas, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.
This patent is subject to a terminal disclaimer.

(21) Appl. No.: 13/566,414

(22) Filed: Aug. 3, 2012

(65) Prior Publication Data

US 2012/0295696 A1 Nov. 22, 2012

Related U.S. Application Data

(63) Continuation of application No. 12/674,355, filed as application No. PCT/US2008/073618 on Aug. 20, 2008, now Pat. No. 8,262,466.

(60) Provisional application No. 61/057,615, filed on May 30, 2008, provisional application No. 60/956,800, filed on Aug. 20, 2007.

(51) Int. Cl.
*A63F 9/24* (2006.01)
*A63F 13/00* (2006.01)

(52) U.S. Cl.
USPC .................. 463/42; 463/10; 463/11; 463/12; 463/13; 463/16; 463/17; 463/18; 463/19; 463/20; 463/40; 463/41; 725/40; 725/41; 725/42; 725/43

(58) Field of Classification Search
USPC ........... 463/10–13, 16, 20–22, 25, 29, 40–42; 273/138.1, 139, 142 B, 142 A, 142 J, 273/148 A, 149 P, 149 R, 243, 292–293, 304, 273/306, 309; 725/39–43, 52
See application file for complete search history.

(56) References Cited

U.S. PATENT DOCUMENTS 5,816,918 A 10/1998 Kelly et al.
6,293,865 B1 9/2001 Kelly et al.
(Continued)

FOREIGN PATENT DOCUMENTS

EP 1343125 9/2003
EP 1628270 2/2006
(Continued)

OTHER PUBLICATIONS

U.S. Appl. No. 13/548,269, filed Jul. 13, 2012, Anderson, Peter R., et al.
(Continued)

*Primary Examiner* — Arthur O. Hall
*Assistant Examiner* — Jasson Yoo
(74) *Attorney, Agent, or Firm* — DeLizio Gilliam, PLLC

(57) ABSTRACT

Described are one or more embodiments that include a browser application ("browser") with a first part (e.g., a toolbar, a dropdown, a pop-up, a widget, etc.) that presents first content associated with one or more wagering games and a second part (e.g., a main content display area) that concurrently presents second content independently from presentation of the first content in the first part of the browser. In some embodiments, the first content and second content are from separate content providers. Some embodiments are directed to determining, based on concurrent presentation of the first content and the second content, that one or more awards are available from a first of the content providers conditional upon performance of one or more activities indicated by a second of the content providers, and the browser application presents one or more indicators to indicate the one or more awards and/or the one or more activities.

31 Claims, 20 Drawing Sheets

(56) References Cited

U.S. PATENT DOCUMENTS

| | | | | |
|---|---|---|---|---|
| 6,674,448 | B1 | 1/2004 | Garahi et al. | |
| 6,695,701 | B2 | 2/2004 | Aronson | |
| 6,789,201 | B2 | 9/2004 | Barton et al. | |
| 7,054,830 | B1 * | 5/2006 | Eggleston et al. | 705/14.26 |
| 7,222,303 | B2 | 5/2007 | Oren et al. | |
| 7,252,591 | B2 | 8/2007 | Van Asdale | |
| 7,255,645 | B2 | 8/2007 | Steil et al. | |
| 7,828,656 | B2 * | 11/2010 | Paulsen et al. | 463/32 |
| 7,905,780 | B2 | 3/2011 | Morrow et al. | |
| 7,950,999 | B2 | 5/2011 | Morrow et al. | |
| 7,963,839 | B2 | 6/2011 | Gatto et al. | |
| 8,028,315 | B1 | 9/2011 | Barber | |
| 8,091,111 | B2 | 1/2012 | Logan et al. | |
| 8,262,466 | B2 | 9/2012 | Anderson et al. | |
| 2002/0059099 | A1 | 5/2002 | Coletta | |
| 2002/0147047 | A1 * | 10/2002 | Letovsky et al. | 463/42 |
| 2003/0105663 | A1 | 6/2003 | Steinman et al. | |
| 2004/0087365 | A1 | 5/2004 | Akers et al. | |
| 2005/0021472 | A1 | 1/2005 | Gettman et al. | |
| 2005/0043097 | A1 | 2/2005 | March et al. | |
| 2005/0203844 | A1 | 9/2005 | Ferguson et al. | |
| 2005/0283800 | A1 | 12/2005 | Ellis et al. | |
| 2006/0019741 | A1 | 1/2006 | Tobin | |
| 2006/0068919 | A1 * | 3/2006 | Gottfurcht | 463/42 |
| 2006/0073888 | A1 * | 4/2006 | Nguyen et al. | 463/27 |
| 2006/0100008 | A1 | 5/2006 | Wright et al. | |
| 2006/0123356 | A1 | 6/2006 | Sobeski et al. | |
| 2006/0148554 | A1 | 7/2006 | Hornik et al. | |
| 2006/0252530 | A1 | 11/2006 | Oberberger et al. | |
| 2007/0077994 | A1 | 4/2007 | Betteridge | |
| 2007/0179842 | A1 | 8/2007 | Chen | |
| 2007/0202941 | A1 * | 8/2007 | Miltenberger et al. | 463/25 |
| 2008/0153583 | A1 | 6/2008 | Huntley et al. | |
| 2008/0176618 | A1 | 7/2008 | Toompere | |
| 2008/0254881 | A1 | 10/2008 | Lutnick et al. | |
| 2009/0042643 | A1 | 2/2009 | Gagner et al. | |
| 2010/0076818 | A1 | 3/2010 | Peterson et al. | |
| 2011/0059800 | A1 | 3/2011 | Anderson et al. | |
| 2011/0111844 | A1 | 5/2011 | Anderson et al. | |
| 2011/0130194 | A1 | 6/2011 | Anderson et al. | |
| 2011/0159948 | A1 | 6/2011 | Anderson et al. | |
| 2011/0282783 | A1 | 11/2011 | Ferguson et al. | |
| 2012/0289313 | A1 | 11/2012 | Anderson et al. | |
| 2012/0295697 | A1 | 11/2012 | Anderson et al. | |
| 2012/0302326 | A1 | 11/2012 | Anderson et al. | |
| 2013/0157747 | A1 | 6/2013 | Anderson et al. | |

FOREIGN PATENT DOCUMENTS

| | | |
|---|---|---|
| EP | 1783707 | 5/2007 |
| EP | 2190544 | 5/2010 |
| JP | 2002143559 | 5/2002 |
| JP | 2005058537 | 3/2005 |
| WO | WO-03054703 | 7/2003 |
| WO | WO-2004111957 | 12/2004 |
| WO | WO-2006027677 | 3/2006 |
| WO | WO-2009026305 | 2/2009 |
| WO | WO-2009026307 | 2/2009 |
| WO | WO-2009026308 | 2/2009 |
| WO | WO-2009026309 | 2/2009 |

OTHER PUBLICATIONS

"Download the free Online Games Toolbar", *Online Games Toolbar* http://www.games-toolbar.com/ Date Obtained from the Internet: Nov. 16, 2010 Aug. 13, 2006 , 1 page.
"European Application No. 08798204.7 Extended European Search Report", Jan. 7, 2011 , 8 pages.
"European Application No. 08827624.1 Extended European Search Report", Jan. 5, 2011 , 7 pages.
"European Application No. 08827861.9 Extended European Search Report", Dec. 15, 2011 , 8 pages.
"European Application No. 08828029.2 Extended European Search Report", Dec. 10, 2010 , 9 pages.
"PCT Application No. PCT/US08/73613 International Preliminary Report on Patentability", Sep. 18, 2009 , 10 pages.
"PCT Application No. PCT/US08/73613 International Search Report", Nov. 3, 2008 , 11 pages.
"PCT Application No. PCT/US08/73616 International Preliminary Report on Patentability", Nov. 17, 2009 , 12 pages.
"PCT Application No. PCT/US08/73616 International Search Report", Nov. 3, 2008 , 11 pages.
"PCT Application No. PCT/US08/73617 International Preliminary Report on Patentability", Nov. 24, 2010 , 8 pages.
"PCT Application No. PCT/US08/73617 International Search Report", Nov. 3, 2008 , 10 pages.
"PCT Application No. PCT/US08/73618 International Preliminary Report on Patentability", Jul. 28, 2010 , 7 pages.
"PCT Application No. PCT/US08/73618 International Search Report", Nov. 3, 2008 , 10 pages.
"U.S. Appl. No. 12/674,340 Office Action", Apr. 20, 2012 , 22 pages.
"U.S. Appl. No. 12/674,351 Office Action", May 30, 2012 , 16 pages.
"U.S. Appl. No. 12/674,355 Office Action", Nov. 14, 2011 , 12 pages.
"U.S. Appl. No. 12/674,388 Office Action", Dec. 1, 2011 , 27 pages.
"Casino Man Gambling Toolbar", http://web.archive.org/web/20050512011429/http://www.casinoman.net/downloads/gambling-toolbar.asp Date Obtained from the Internet: Aug. 9, 2012 May 12, 2005 , 3 pages.
"Free Online Games Toolbar", http://web.archive.org/web/20060813205342/http://www.games-toolbar.com/ Date Obtained from the Internet: Aug. 9, 2012 Aug. 13, 2006 , 2 pages.
"Progressive Jackpot Bar", *Gambling World Online Casino Directory* http://web.archive.org/web/20051027144813/http://www.gambling-world.net/progressivejackpotbar.htm Date Obtained from the Internet: Aug. 9, 2012 Oct. 27, 2005 , 3 pages.
"U.S. Appl. No. 12/674,340 Final Office Action", Aug. 16, 2012 , 12 pages.
U.S. Appl. No. 13/566,672, filed Aug. 3, 2012, Anderson, Peter R., et al.
U.S. Appl. No. 13/566,757, filed Aug. 3, 2012, Anderson, Peter R., et al.
"EP Application No. 08798204.7 Office Action", Feb. 5, 2013 , 9 pages.
"U.S. Appl. No. 13/566,672 Office Action", May 28, 2013 , 8 pages.
"European Application No. 08827624.1 Examination Notification Article 94(3)", Jun. 26, 2013, 8 pages.

* cited by examiner

PRESENTING AND CONTROLLING WAGERING GAME MARKETING INFORMATION

RELATED APPLICATIONS

This application claims the priority to, and is a continuation application of, U.S. application Ser. No. 12/674,355, filed on Feb. 19, 2010. The Ser. No. 12/674,355 application claims priority benefit of PCT Application No. PCT/US08/73618, filed on Aug. 20, 2008, which claims the priority benefit of U.S. Provisional Application Ser. No. 60/956,800 filed Aug. 20, 2007, and U.S. Provisional Application Ser. No. 61/057,615 filed May 30, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2008, WMS Gaming, Inc.

FIELD

Embodiments of the inventive subject matter relate generally to wagering game systems, and more particularly to presenting and controlling wagering game marketing information.

BACKGROUND

Wagering game machines, such as slot machines, video poker machines and the like, have been a cornerstone of the gaming industry for several years. Generally, wagering game machines are confined to physical, "brick-and-mortar" casinos. Consequently, wagering game enthusiasts have primarily been restricted to enjoying wagering games only within those casinos. The explosive expansion of shared wide area networks, social networks, etc., however, has increased the ability for wagering games to be shared on networks that extend beyond the physical walls of a casino. Wagering game manufacturers, providers, and operators, therefore, have attempted to find new ways to share wagering games using those networks.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into four sections. The first section provides an introduction to embodiments of the invention, while the second section describes example operating environments. The third section describes example operations performed by some embodiments. The fourth section presents some general comments.

Introduction

This section provides an introduction to some embodiments of the invention.

Wagering games are expanding in popularity. Many gamers are demanding greater access to wagering games and content related to wagering games. As a result, some companies have created network sites that provide a full host of wagering-game-related content (hereinafter "wagering-game-related sites"). Wagering-game-related content can include content for presenting wagering games, and content for presenting activities (e.g., entertainment games) that award value (e.g., points) usable for playing wagering games, invoking wagering game bonus events, obtaining casino services, etc.

Figure 1:
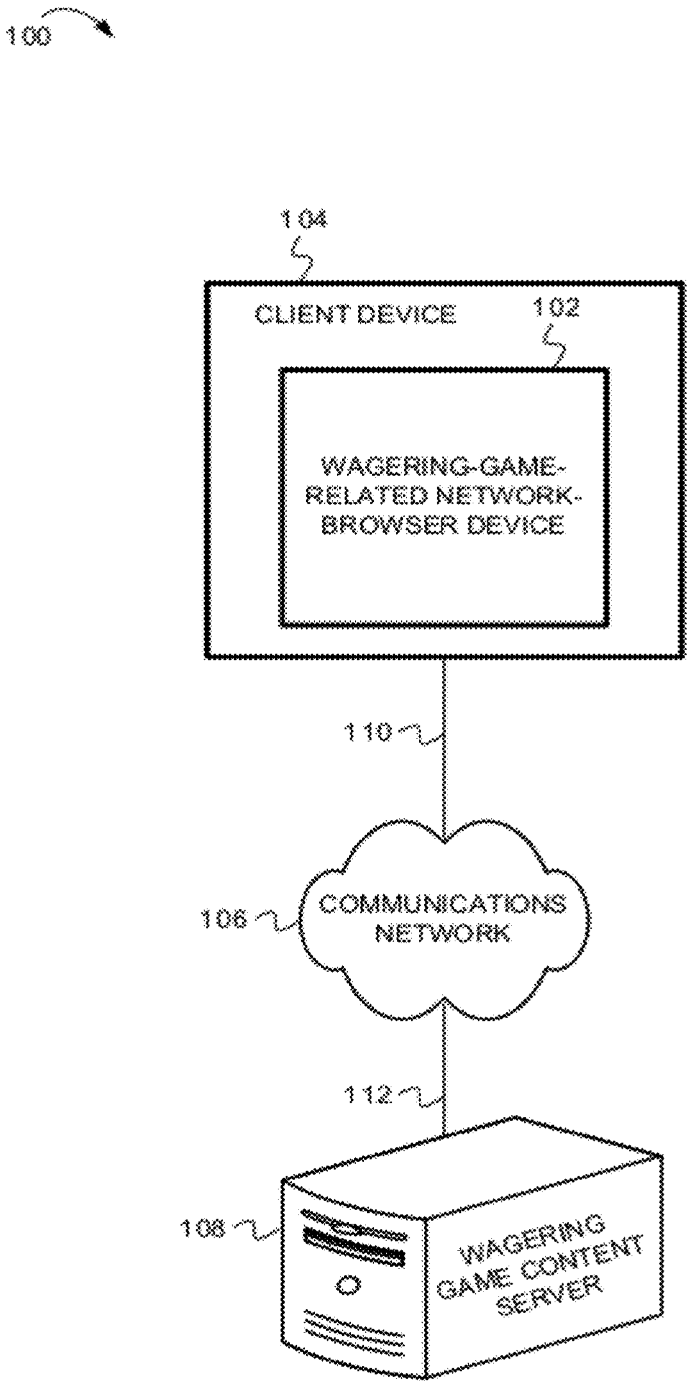
FIG. 1 is an illustration of a wagering-game-related network browser device 102 connected to a communication network 106, according to some embodiments of the invention.

Gamers can access the wagering-game-related sites using a network-browsing-capable software application ("browser"). Gamers can log on to the network site with a user account and access the site content within a main content display on the browser. Currently, however, when a user leaves the network site, that user loses contact with the site content. Some users, however, may want to maintain some contact with the site, even if the user is not currently accessing the wagering-game-related site through the main content display of the browser. FIG. 1 shows a browser device that allows a user to access content on a wagering-game-related network site and present wagering-game-related content in conjunction with wagering-game-related objects. These objects can be buttons, menus, toolbars, or any other such programmatic objects that are separate from the main content display. Consequently, according to some embodiments of the invention, a user can access wagering-game-related content even while the user is not directly accessing at the wagering-game-related network site.

FIG. 1 is an illustration of a wagering-game-related network browser device 102 ("browser device") connected to a communication network 106, according to some embodiments of the invention. In FIG. 1, a client device 104 can use the browser device 102. The client device 104 can be any machine or device that can run or access browser applications, such as personal computers, remote access client devices, servers, cell phones, personal digital assistants, etc. The client device 104 is connected to a communication network 106 via a network communication connection 110. A wagering game server 108 is also connected to the communication network 106 via a network communication connection 112. The communication network 106 is any network that can be used to exchange content between the client device 104 and a wagering game content server 108. The wagering game content server 108 can communicate and store wagering-game-related and non-wagering-game related content. In other words, the wagering game content server 108 can host wagering-game-related network sites.

The browser device 102 can control wagering-game-related objects and content in a network-browsing capable application. The wagering-game-related objects can include toolbars, buttons, etc., as will be described further below. In some embodiments, the browser device 102 can have the wagering-game-related objects pre-built. On the other hand, in other embodiments, the wagering game server 108 can transfer a plug-in, add-in, skin, etc. to the client device 104. The plug-in can contain the wagering-game-related objects and can install the wagering-game-related objects into the browser device 102. Thus, the wagering-game-related objects would not need to be pre-built into the browser device 102.

Although FIG. 1 describes some embodiments, the following sections describe many other features and embodiments.

Example Operating Environments

This section describes example operating environments and networks and presents structural aspects of some embodiments. More specifically, this section includes discussion about wagering game networks, wagering game machine architectures, computer systems, wagering-game-related network browser device architectures, network-browsing-capable applications, and a mobile wagering game machines.

Example Wagering Game Network

Figure 2:
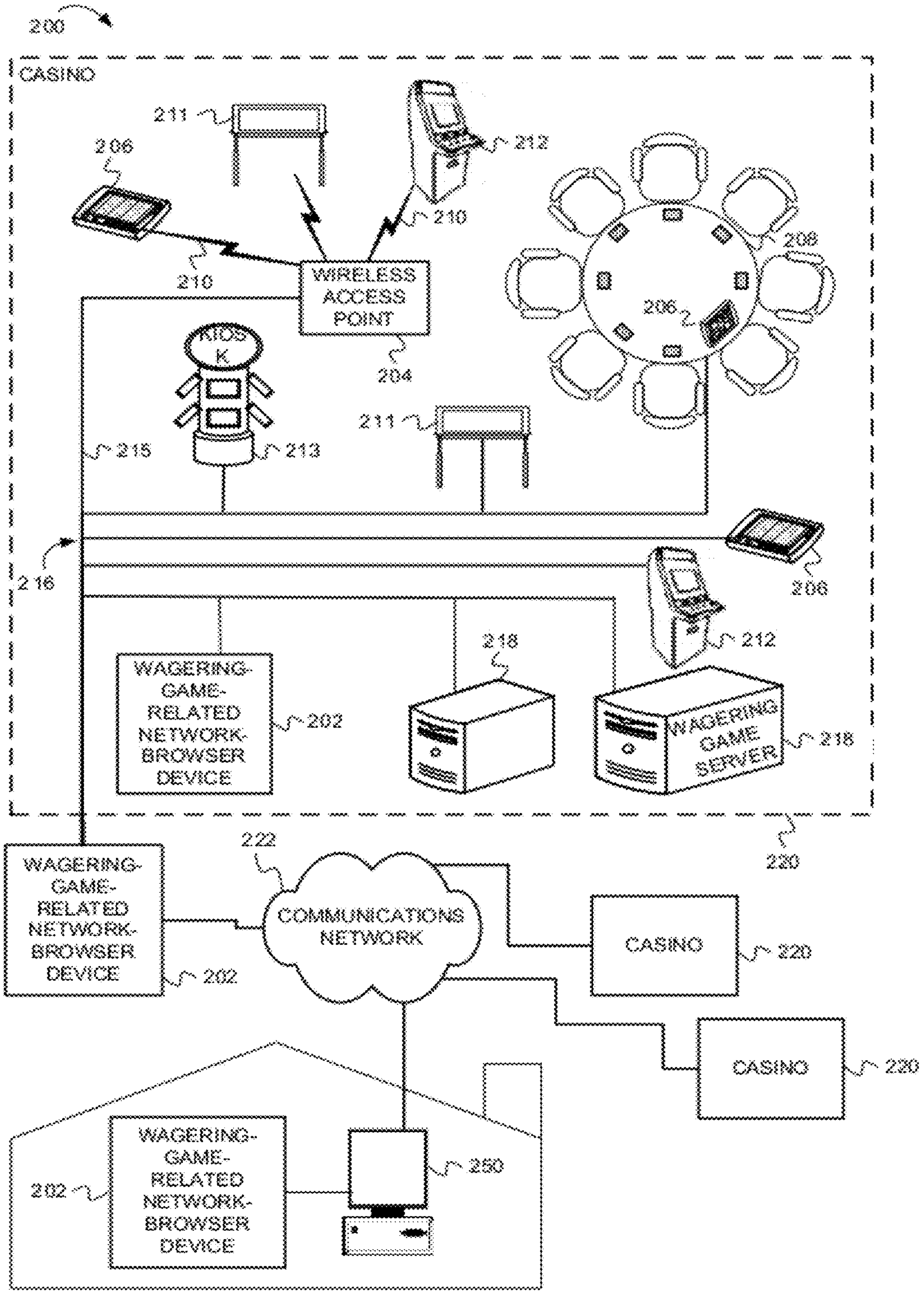
FIG. 2 is an illustration of a wagering game network 200, according to some embodiments of the invention.

FIG. 2 is an illustration of a wagering game network 200, according to some embodiments of the invention. In FIG. 2, the wagering game network 200 includes a plurality of casinos 220 connected to a communications network 222. Each casino 220 includes a local area network 216, which includes an access point 204, one or more servers 218, and wagering game machines 206, 211, 212. In one embodiment, the local area network 216 may also include specific types of servers 218, such as a wagering game server, a promotions server, a player information server, a management server, a wagering game content server, or other servers not shown herein, such as social networking servers, progressive servers, player tracking servers, file servers, web servers, application servers, database servers, and casino and player account servers. There are many other devices, in other embodiments, that are not shown but that may exist in a wagering game network (e.g., routers, switches, monitoring equipment, etc.). The access point 204 provides wireless communication links 210 with wagering game machines 206, 211, 212. The local area network 216 may also include wired communication links 215 to connect to servers 218, wireless access point 204, wagering game machines 206, 211, 212, one or more docking stations 208 and one or more kiosks 213 for storing mobile machines. The wired and wireless communication links can employ any suitable connection technology, such as Bluetooth, 802.11, Ethernet, public switched telephone networks, SONET, etc. In some embodiments, the servers 218 can serve wagering games and distribute content to devices located in other casinos 220 or at other locations on the communications network 222.

The wagering game machines 206, 211, 212 described herein can take any suitable form, such as floor standing models (e.g., 212), handheld mobile units (e.g., 206), bar-top models, workstation-type console models, surface computing machines (e.g., 211), etc. Further, the wagering game machines 206, 212 can be primarily dedicated for use in conducting wagering games, or can include non-dedicated devices, such as mobile phones, personal digital assistants, personal computers, etc.

In some embodiments, wagering game machines 206, 211, 212 and wagering game servers 218 work together such that wagering game machines 206, 211, 212 can be operated as a thin, thick, or intermediate client. For example, one or more elements of game play may be controlled by the wagering game machines 206, 212 (client) or the wagering game servers 218 (server). Game play elements can include executable game code, lookup tables, configuration files, game outcome, audio or visual representations of the game, game assets or the like. In a thin-client example, the wagering game server 218 can perform functions such as determining game outcome or managing assets, while the wagering game machines 206, 211, 212 can present a graphical representation of such outcome or asset modification to the user (e.g., player). In a thick-client example, the wagering game machines 206, 211, 212 can determine game outcomes and communicate the outcomes to the wagering game server 218 for recording or managing a player's account.

In some embodiments, either the wagering game machines 206, 211, 212 (client) or the wagering game server(s) 218 can provide functionality that is not directly related to game play. For example, account transactions and account rules may be managed centrally (e.g., by the wagering game server(s) 218) or locally (e.g., by the wagering game machines 206, 211, 212). Other functionality not directly related to game play may include power management, presentation of advertising, software or firmware updates, system quality or security checks, etc.

The wagering game network 200 also includes a wagering-game-related network browser device 202. The wagering-game-related network browser device 202 can control wagering-game-related objects and content in a network-browsing capable application. The wagering-game-related network browser device 202 may be internal or external to a casino 220 and may interact with any suitable wagering game network component to control wagering-game-related objects and content in a network-browsing capable application.

In some embodiments, a user could use a personal computer 250 from home, or any other location external to the casinos 220. The personal computer 250 can use the wagering-game-related network browser device 202. The wagering-game-related network browser device 202 can use wagering-game-related objects to assign and display points in a network browser application on the personal computer 250. The wagering-game-related network browser device 202 can communicate those points to the wagering game server 218. Consequently, if a user visits one of the casinos 220, that user can use those points in the casino 220 to engage in wagering-game activity and or to obtain casino services. For example, a user could use the wagering game machines 206, 211, 212 to log on to a user account that includes a total of points earned by the user. The user could use the wagering game machines 206, 211, 212 to spend those points playing wagering games, ordering services, etc.

Any of the wagering game network components (e.g., the wagering game machines 206, 211, 212) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Wagering Game Machine Architecture

Figure 3:
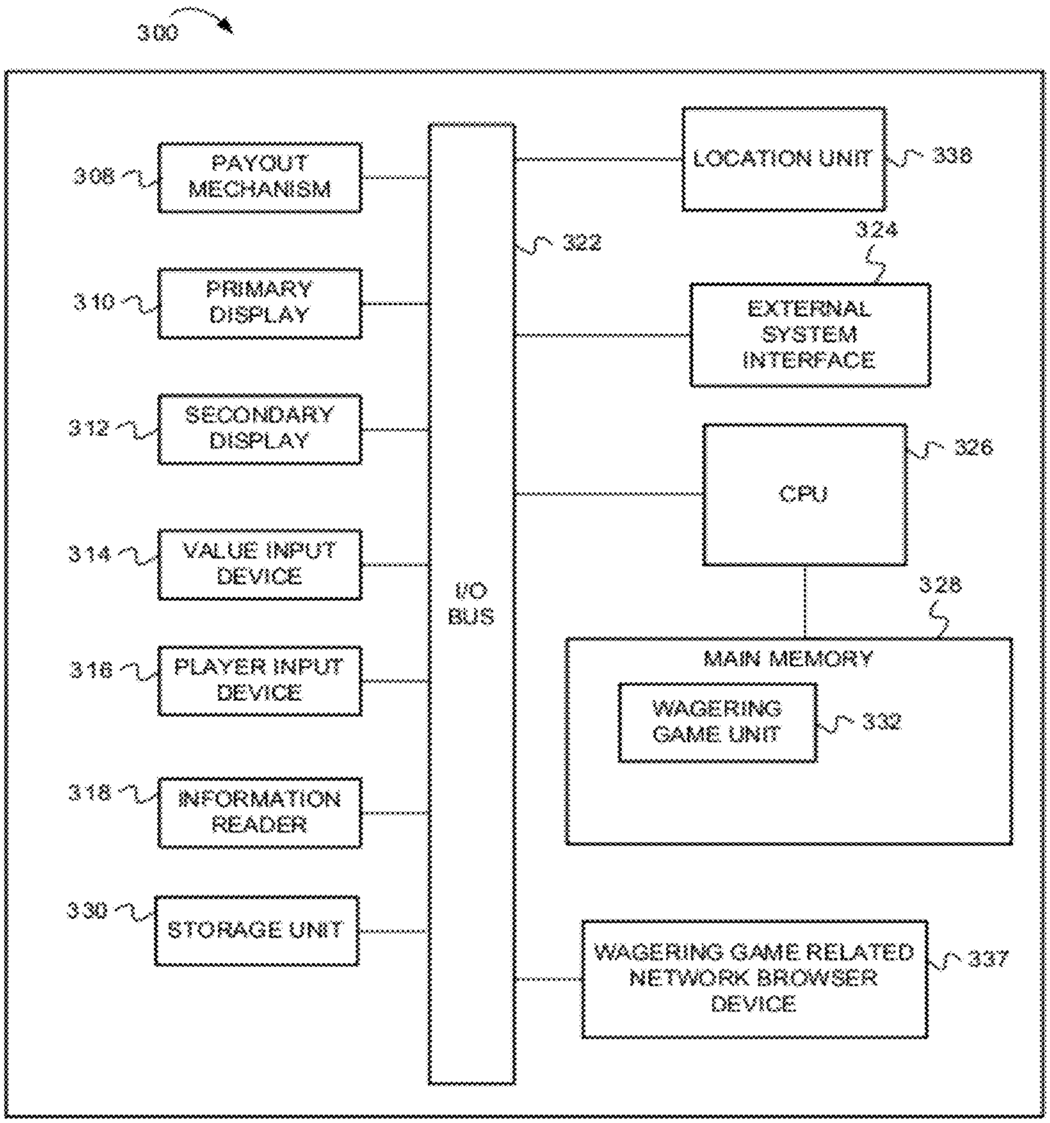
FIG. 3 is an illustration of a wagering game machine architecture 300, according to some embodiments of the invention.

FIG. 3 is an illustration of a wagering game machine architecture 300, according to some embodiments of the invention. In FIG. 3, the wagering game machine architecture 300 includes a wagering game machine 306, which includes a central processing unit (CPU) 326 connected to main memory 328. The CPU 326 can include any suitable processor, such as an Intel® Pentium processor, Intel® Core 2 Duo processor, AMD Opteron™ processor, or UltraSPARC processor. The main memory 328 includes a wagering game unit 332. In one embodiment, the wagering game unit 332 can present wagering games, such as video poker, video black jack, video slots, video lottery, reel slots, etc., in whole or part.

The CPU 326 is also connected to an input/output ("I/O") bus 322, which can include any suitable bus technologies, such as an AGTL+ frontside bus and a PCI backside bus. The I/O bus 322 is connected to a payout mechanism 308, primary display 310, secondary display 312, value input device 314, player input device 316, information reader 318, and storage unit 330. The player input device 316 can include the value input device 314 to the extent the player input device 316 is used to place wagers. The I/O bus 322 is also connected to an external system interface 324, which is connected to external systems 304 (e.g., wagering game networks). The external system interface 324 can include logic for exchanging information over wired and wireless networks (e.g., 802.11g transceiver, Bluetooth transceiver, Ethernet transceiver, etc.)

The I/O bus 322 is also connected to a location unit 338. The location unit 338 can create player information that indicates the wagering game machine's location/movements in a casino. In some embodiments, the location unit 338 includes a global positioning system (GPS) receiver that can determine the wagering game machine's location using GPS satellites. In other embodiments, the location unit 338 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 3, in some embodiments, the location unit 338 is not connected to the I/O bus 322.

In one embodiment, the wagering game machine 306 can include additional peripheral devices and/or more than one of each component shown in FIG. 3. For example, in one embodiment, the wagering game machine 306 can include multiple external system interfaces 324 and/or multiple CPUs 326. In one embodiment, any of the components can be integrated or subdivided.

In one embodiment, the wagering game machine 306 includes a wagering-game-related network browser device 337. The wagering-game-related network browser device 337 can process communications, commands, or other information, where the processing can control wagering-game-related objects and content.

Furthermore, any component of the wagering game machine 306 can include hardware, firmware, and/or machine-readable media including instructions for performing the operations described herein.

Example Wagering Game Network Computer

Figure 4:
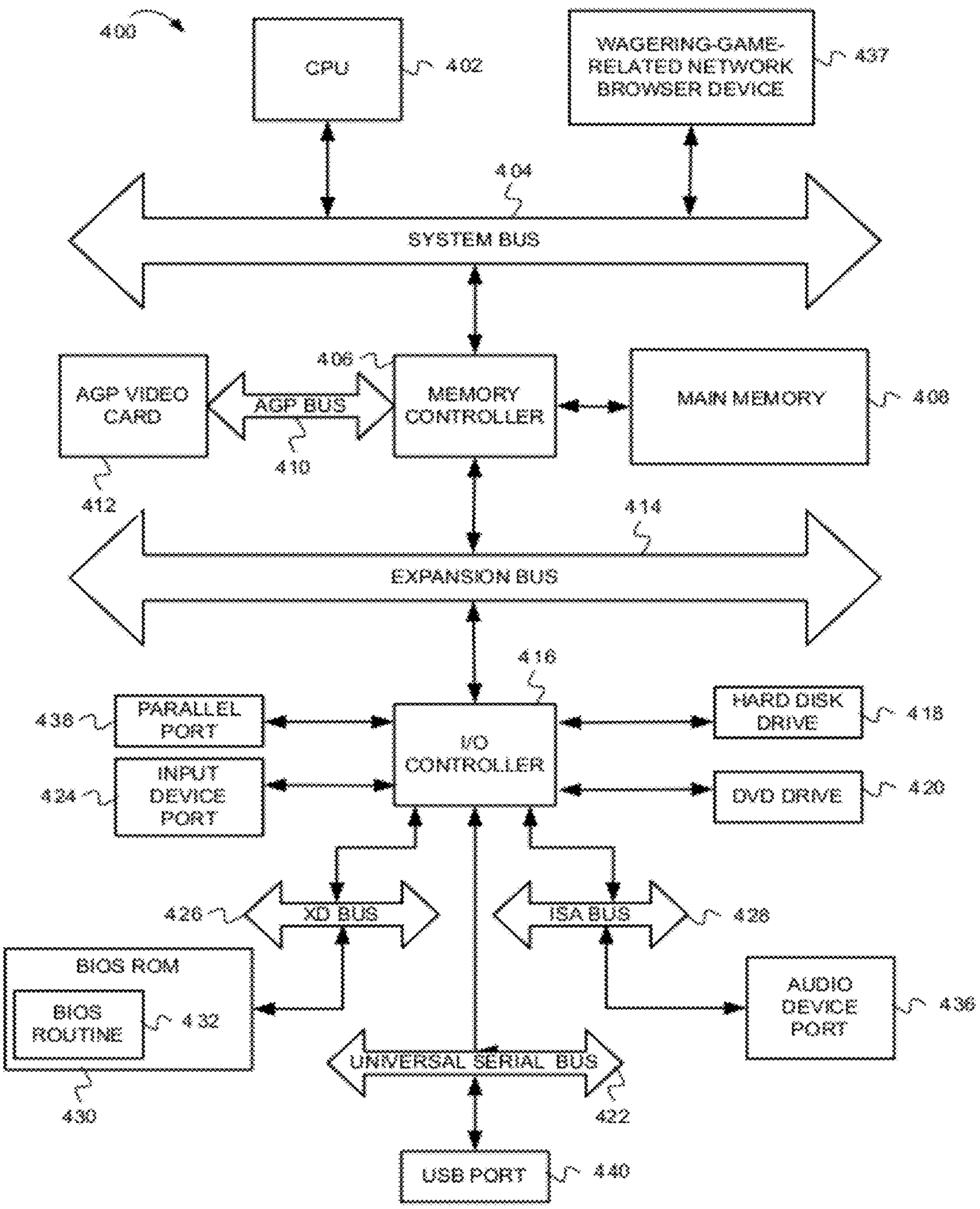
FIG. 4 is an illustration of a wagering game network computer 400, according to some embodiments of the invention.

FIG. 4 is an illustration of a wagering game network computer 400, according to some embodiments of the invention. The wagering game network computer 400 can be employed as any suitable wagering-game-related server, personal device for accessing wagering-game-related content, etc. In FIG. 4, a wagering game network computer 400 includes a CPU 402 connected to a system bus 404. The system bus 404 is connected to a memory controller 406 (also called a north bridge), which is connected to a main memory unit 408, AGP bus 410 and AGP video card 412. The main memory unit 408 can include any suitable memory random access memory (RAM), such as synchronous dynamic RAM, extended data output RAM, etc. In one embodiment, the wagering game network computer 400 includes a wagering-game-related network browser device 437 to control wagering-game-related objects and content in a network-browsing capable application. The wagering-game-related network browser device 437 can process communications, commands, or other information, where the processing can control wagering-game-related objects and content in a network-browsing capable application. The wagering-game-related network browser device 437 is shown connected to the system bus 404, however the wagering-game-related network browser device 437 could be connected to a different bus or device within the wagering game network computer 400.

An expansion bus 414 connects the memory controller 406 to an input/output (I/O) controller 416 (also called a south bridge). According to embodiments, the expansion bus 414 can be include a peripheral component interconnect (PCI) bus, PCIX bus, PC Card bus, CardBus bus, InfiniBand bus, or an industry standard architecture (ISA) bus, etc.

The I/O controller is connected to a hard disk drive (HDD) 418, digital versatile disk (DVD) 420, input device ports 424 (e.g., keyboard port, mouse port, and joystick port), parallel port 438, and a universal serial bus (USB) 422. The USB 422 is connected to a USB port 440. The I/O controller 416 is also connected to an XD bus 426 and an ISA bus 428. The ISA bus 428 is connected to an audio device port 436, while the XD bus 426 is connected to BIOS read only memory (ROM) 430.

In some embodiments, the wagering game network computer 400 can include additional peripheral devices and/or more than one of each component shown in FIG. 4. For example, in some embodiments, the wagering game network computer 400 can include multiple external multiple CPUs 402. In some embodiments, any of the components can be integrated or subdivided.

Any component of the wagering game network computer 400 can be implemented as hardware, firmware, and/or machine-readable media including instructions for performing the operations described herein.

Example Wagering-Game-Related Network Browser Device Architecture

Figure 5:
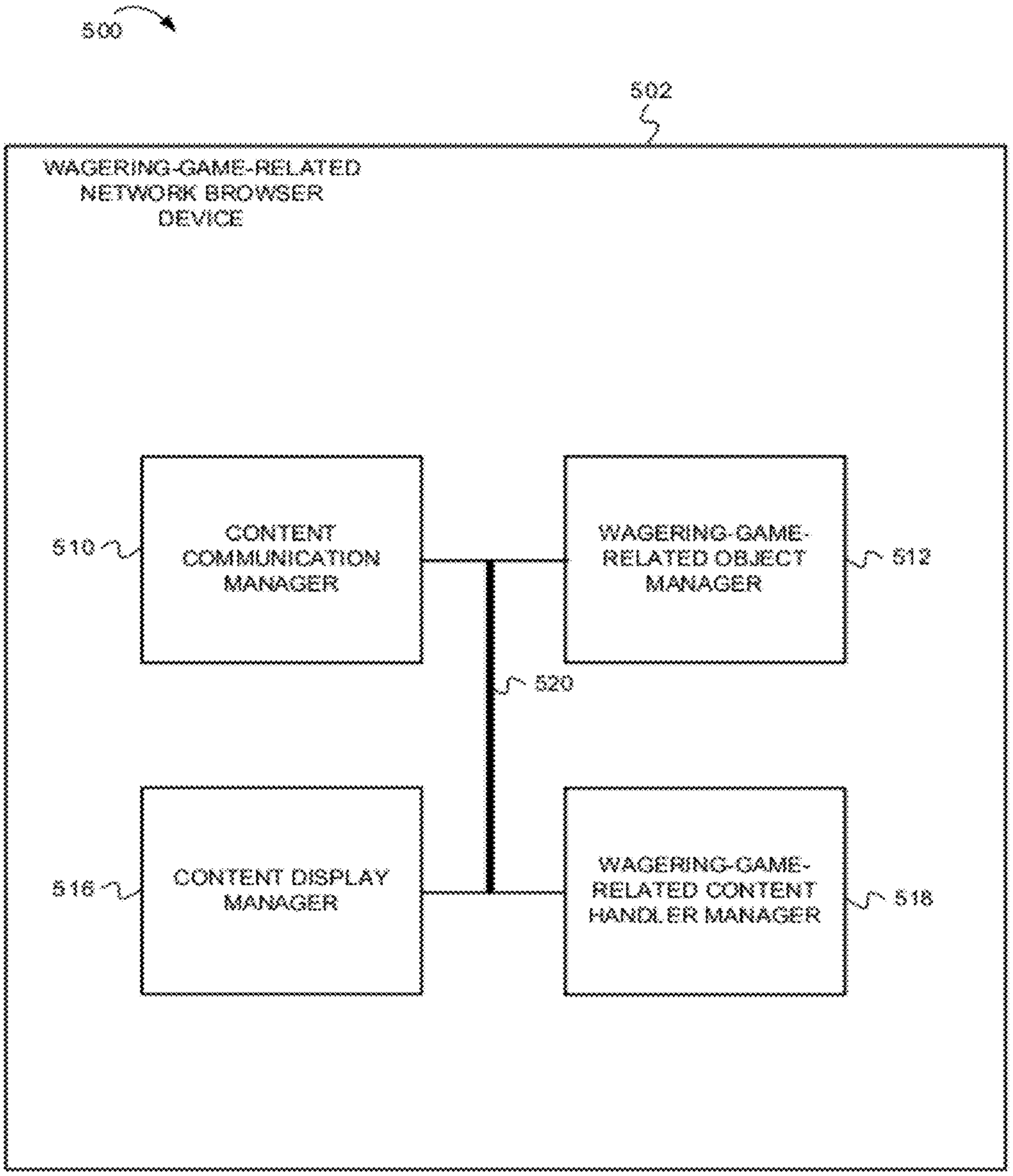
FIG. 5 is an illustration of a wagering-game-related network browser device architecture 500, according to some embodiments of the invention.

FIG. 5 is an illustration of a wagering-game-related network browser device architecture 500, according to some embodiments of the invention. In FIG. 5, the wagering-game-related network browser device architecture 500 includes a content communication manager 510 to exchange wagering-game-related content with devices on a wagering-game network. Wagering-game-related content includes content provided by wagering game content servers.

In FIG. 5, the wagering-game-related network browser device architecture 500 also includes a content display manager 516 to display wagering-game-related content. In some embodiments of the invention, the content display manager 516 includes a main content display to display content from a network site.

In FIG. 5, the wagering-game-related network browser device architecture 500 also includes a wagering-game-related object manager 512 to present wagering game related objects (e.g., toolbars, buttons, dropdown menus, etc.). The wagering-game-related object manager 512 can also receive user-input regarding wagering-game-related objects. For example, it can detect activation of an object and initiate appropriate operations. Furthermore, the wagering-game-related object manager 512 can track content driven event outcomes, such as scores, points, etc., that represent earned values. The wagering-game-related object manager 512 can then convey the values to a wagering game server for storage in a user's account. The content display manager 516, described further above, can display the values on wagering-game-related objects that are separate from the main content display.

In FIG. 5, the wagering-game-related network browser device architecture 500 also includes a wagering-game-related content handler manager 518 to control wagering-game-related plug-ins and add-ins. The plug-ins can be used to manage or control (e.g., load, cache, unload) wagering-game-related objects within a browser application. The wagering-game-related content handler manager 518 controls add-ins to third-party applications and helper applications that can present and control wagering-game-related objects and wagering-game-related content.

In FIG. 5, the content communication manager 510, the wagering-game-related object manager 512, the content display manager 515 and the wagering-game-related content handler manager 518 can communicate via communication interface 520. Furthermore, any component of the wagering-game-related network browser device architecture 500 can be implemented as hardware, firmware, and/or machine-readable media including instructions for performing the operations described herein

Example Network-Browsing-Capable Application

Figure 7:
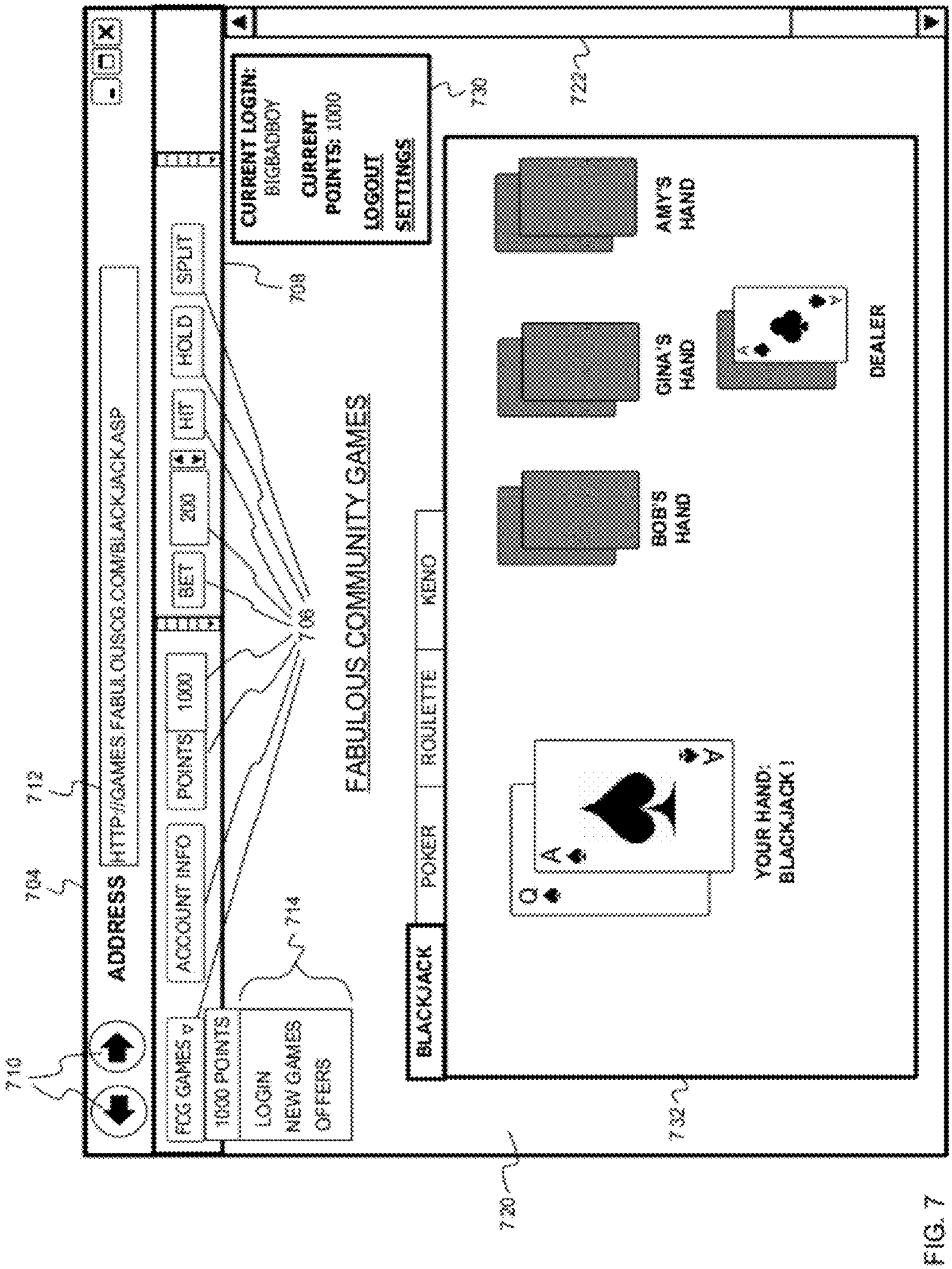
FIG. 7 is an illustration of a network-browsing-capable application 704, according to some embodiments of the invention.

FIG. 7 is an illustration of a network-browsing-capable application 704, according to some embodiments of the invention. In FIG. 7, the network-browsing-capable application 704 has navigational buttons 710, and navigational bars 722 to navigate backward and forward, also upward and downward, on a network site. The network-browsing-capable application 704 also has an address field 712 to designate a network location, such as a Uniform Resource Locator (URL), domain name, an IP address, etc. The network-browsing-capable application 704 also has a main content display 720 to display content, such as wagering-game related content from the site designated in the address field 712. Wagering-game-related content 732 can include graphics, sounds, and other media for representing wagering games of all types. Wagering-game-related content can also include account information 730 and other information related to wagering games.

The network-browsing-capable application 704 also has wagering-game-related objects, such as buttons 706, dropdown menus 714, toolbars 708, or any other programmatic object that is separate from the main content display 720. In FIG. 7, the wagering-game-related objects are included on toolbars 708 above the main content display 720. However, the wagering-game-related objects could be positioned anywhere on the network-browsing-capable application 704, including as floating toolbars. Because the wagering-game-related objects are separate from the main content display 720, the objects can maintain a constant state even if the state of the main content display changes.

The wagering-game-related objects can be used to display wagering-game-related content (e.g., account information, points, messages, notices, etc.) from a wagering-game-related network site and also to activate operations to enable wagering game activity within the application. For example, wagering-game-related content, like points and account information, can be shown in the main content display 720 because it is content from the wagering-game-related network site. That same information, however, can also be accessed and displayed on the wagering-game-related objects.

Example Network-Browsing-Capable Application

Figure 9:
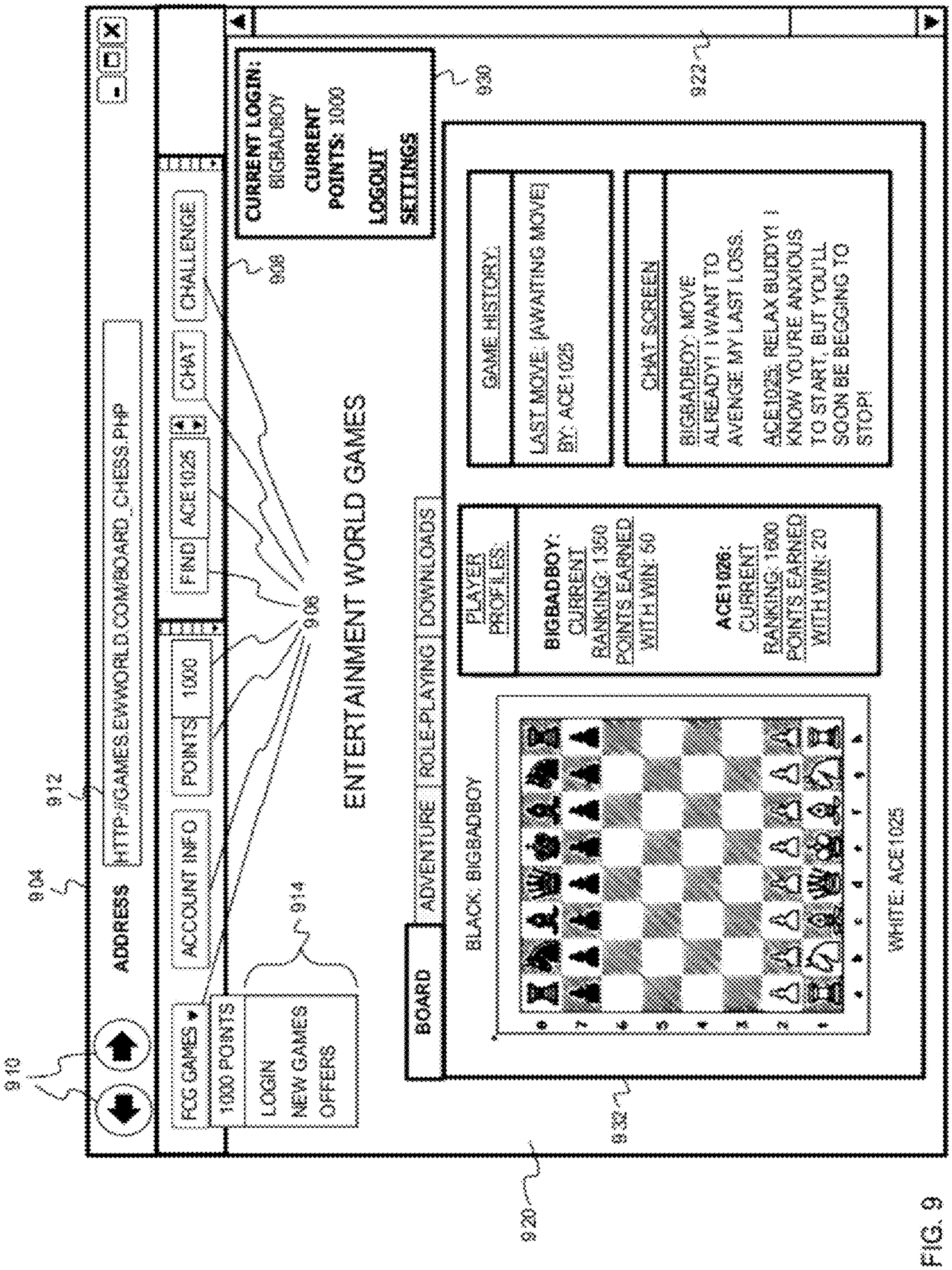
FIG. 9 is an illustration of a network-browsing-capable application 904, according to some embodiments of the invention.

FIG. 9 is an illustration of a network-browsing-capable application 904, according to some embodiments of the invention. In FIG. 9, the network-browsing-capable application 904 has navigational buttons 910, and navigational bars 922, to navigate backward and forward, also upward and downward, on a network site. The network-browsing-capable application 904 also has an address field 912 to designate a network location, such as a domain name, an IP address, etc. The network-browsing-capable application 904 also has a main content display 920 to display content, such as non-wagering-game related content, from the site designated in the address field 912. Non-wagering-game-related content includes content, such as games, account information, etc., that is on a non-wagering-game-related website.

The network-browsing-capable application 904 also has wagering-game-related objects, such as buttons 906, dropdown menus 914, toolbars 908, or any other programmatic objects that are separate from the main content display 920. In some embodiments, the wagering-game-related objects can be referred to as toolbar objects indicating that the objects are contained within a toolbar. Since the wagering-game-related objects are separate from the main content display 920, the objects can maintain a constant state even if the state of the main content display changes. In other words, the wagering-game-related objects can continue to display wagering-game-related content from a wagering game content server while the main content can display other content, such as content from a non-wagering game content server. Consequently, in some embodiments, the wagering-game-related objects constitute a secondary display (i.e., not the main content display) to display content from a wagering game content server regardless of the content displayed by the main content display.

In some embodiments of the invention, activities not directly associated with wagering games can produce content related to wagering games. For example, playing entertainment games (e.g., board games, adventure games, etc.) can produce points for use with wagering game accounts. The wagering-game-related objects can track the points and transmit the points to a wagering game content server, placing the points within a wagering game user's account. The network-browsing-capable application 904 can also permit a user to browse to a wagering-game-related network site, such as the wagering-game-related network site shown in FIG. 7. At the wagering-game-related site, the points can be used for wagering-game-related activity, such as getting access to VIP services, receiving offers, or even playing wagering games.

Example Mobile Wagering Game Machine

Figure 12:
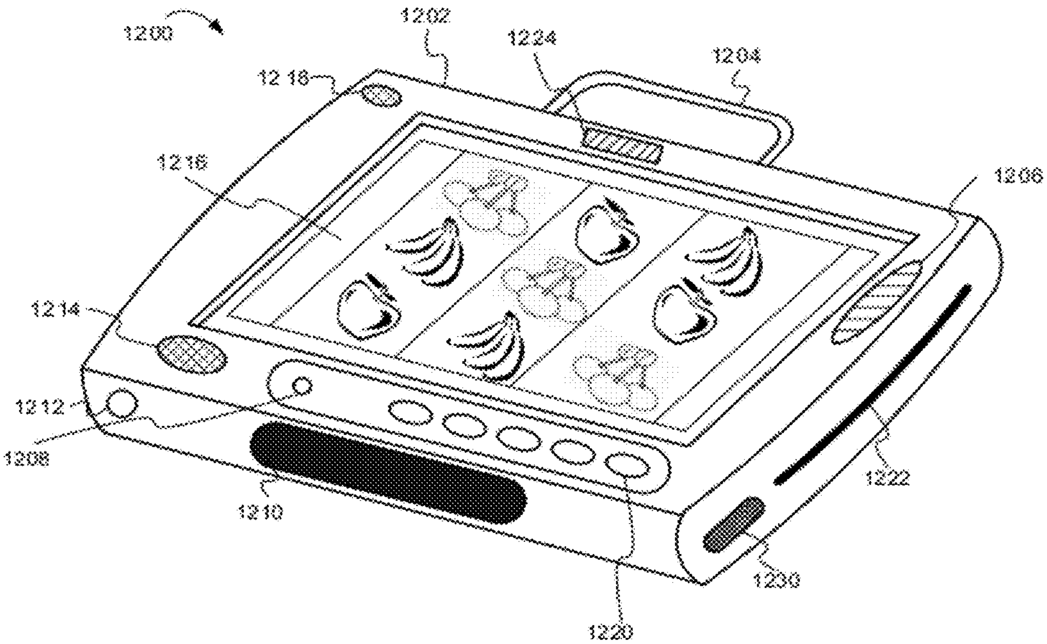
FIG. 12 is an illustration of a mobile wagering game machine 1200, according to some embodiments of the invention.

FIG. 12 is an illustration of a mobile wagering game machine 1200, according to some embodiments of the invention. In FIG. 12, the mobile wagering game machine 1200 includes a housing 1202 for containing internal hardware and/or software such as that described above vis-à-vis FIG. 3. In one embodiment, the housing has a form factor similar to a tablet PC, while other embodiments have different form factors. For example, the mobile wagering game machine 1200 can exhibit smaller form factors, similar to those associated with personal digital assistants. In one embodiment, a handle 1204 is attached to the housing 1202. Additionally, the housing can store a foldout stand 1210, which can hold the mobile wagering game machine 1200 upright or semi-upright on a table or other flat surface.

The mobile wagering game machine 1200 includes several input/output devices. In particular, the mobile wagering game machine 1200 includes buttons 1220, audio jack 1208, speaker 1214, display 1216, biometric device 1206, wireless transmission devices 1212 and 1224, microphone 1218, and card reader 1222. Additionally, the mobile wagering game machine can include tilt, orientation, ambient light, or other environmental sensors.

In one embodiment, the mobile wagering game machine 1200 uses the biometric device 1206 for authenticating players, whereas it uses the display 1216 and speakers 1214 for presenting wagering game results and other information (e.g., credits, progressive jackpots, etc.). The mobile wagering game machine 1200 can also present audio through the audio jack 1208 or through a wireless link such as Bluetooth.

In one embodiment, the wireless communication unit 1212 can include infrared wireless communications technology for receiving wagering game content while docked in a wager gaming station. The wireless communication unit 1224 can include an 802.11G transceiver for connecting to and exchanging information with wireless access points. The wireless communication unit 1224 can include a Bluetooth transceiver for exchanging information with other Bluetooth enabled devices.

In one embodiment, the mobile wagering game machine 1200 is constructed from damage resistant materials, such as polymer plastics. Portions of the mobile wagering game machine 1200 can be constructed from non-porous plastics which exhibit antimicrobial qualities. Also, the mobile wagering game machine 1200 can be liquid resistant for easy cleaning and sanitization.

In some embodiments, the mobile wagering game machine 1200 can also include an input/output ("I/O") port 1230 for connecting directly to another device, such as to a peripheral device, a secondary mobile machine, etc. Furthermore, any component of the mobile wagering game machine 1200 can include hardware, firmware, and/or machine-readable media including instructions for performing the operations described herein.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 6:
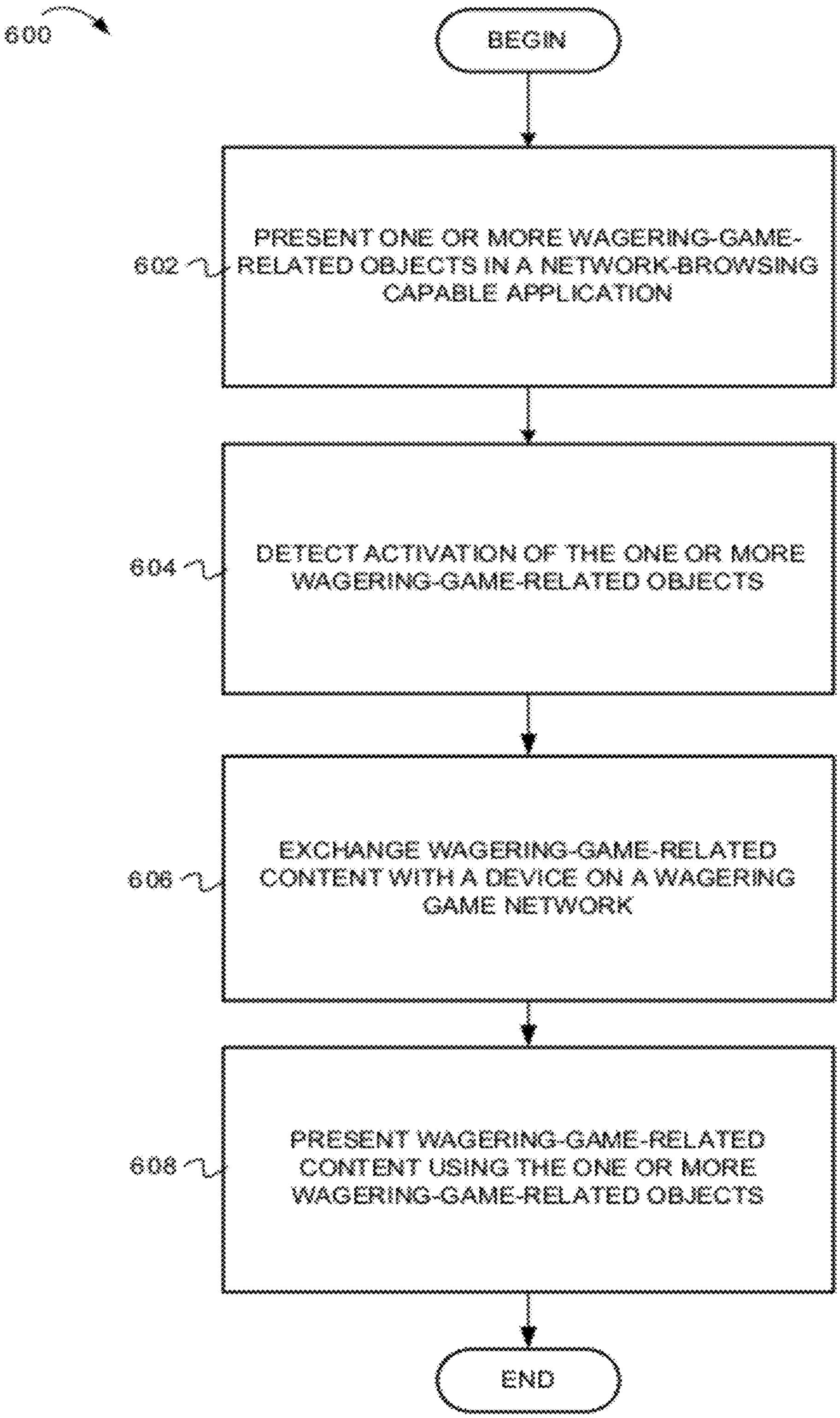
FIG. 6 is a flow diagram 600 illustrating controlling wagering-game-related objects and content in a network-browsing capable application, according to some embodiments of the invention.

FIG. 6 is a flow diagram illustrating controlling wagering-game-related objects and content in a network-browsing capable application, according to some embodiments of the invention. In FIG. 6, the flow 600 begins at processing block 602, where a wagering-game-related network browser device ("browser device") presents one or more wagering-game-related objects in a network-browsing capable application. The wagering-game-related objects can include buttons, dropdowns and toolbars, such as those shown in FIG. 7 and FIG. 9. The browser device could also allow a user to customize or configure the wagering-game-related objects.

In FIG. 6, the flow 600 continues at processing block 604, where the browser device detects activation of the one or more wagering-game-related objects. More specifically, referring momentarily to FIG. 7, buttons 706, for example, could be used to access account information, display content from a wagering game content server, or even to play wagering games. Likewise, referring momentarily to FIG. 9, buttons 906, for example, could be used to account information and display content from a wagering game content server, even though the browser device might be accessing a non-wagering-game-related network site. Even further, still referring to FIG. 9, the wagering-game-related objects can activate events, activities and services that are not directly related to wagering games, but that might be other services offered by the wagering-game-related network site. These events, activities, and services could include searching for a user name stored on the wagering game content server, chatting with another user, or in inviting the user to engage in non-wagering-game-related activity.

In FIG. 6, the flow 600 continues at processing block 606, where the browser device exchanges wagering-game-related content with a device on a wagering game network, such as a wagering game content server. For example, a content communication manager could exchange wagering-game-related content with between the browser device and the wagering game content server on a wagering game network.

In FIG. 6, the flow 600 continues at processing block 608, where the browser device presents wagering-game-related content using the one or more wagering-game-related objects. For example, referring again to FIG. 7 and FIG. 9, the browser device presents wagering-game-related content (e.g., points, account information, etc.) on the wagering-game-related objects.

Figure 8:
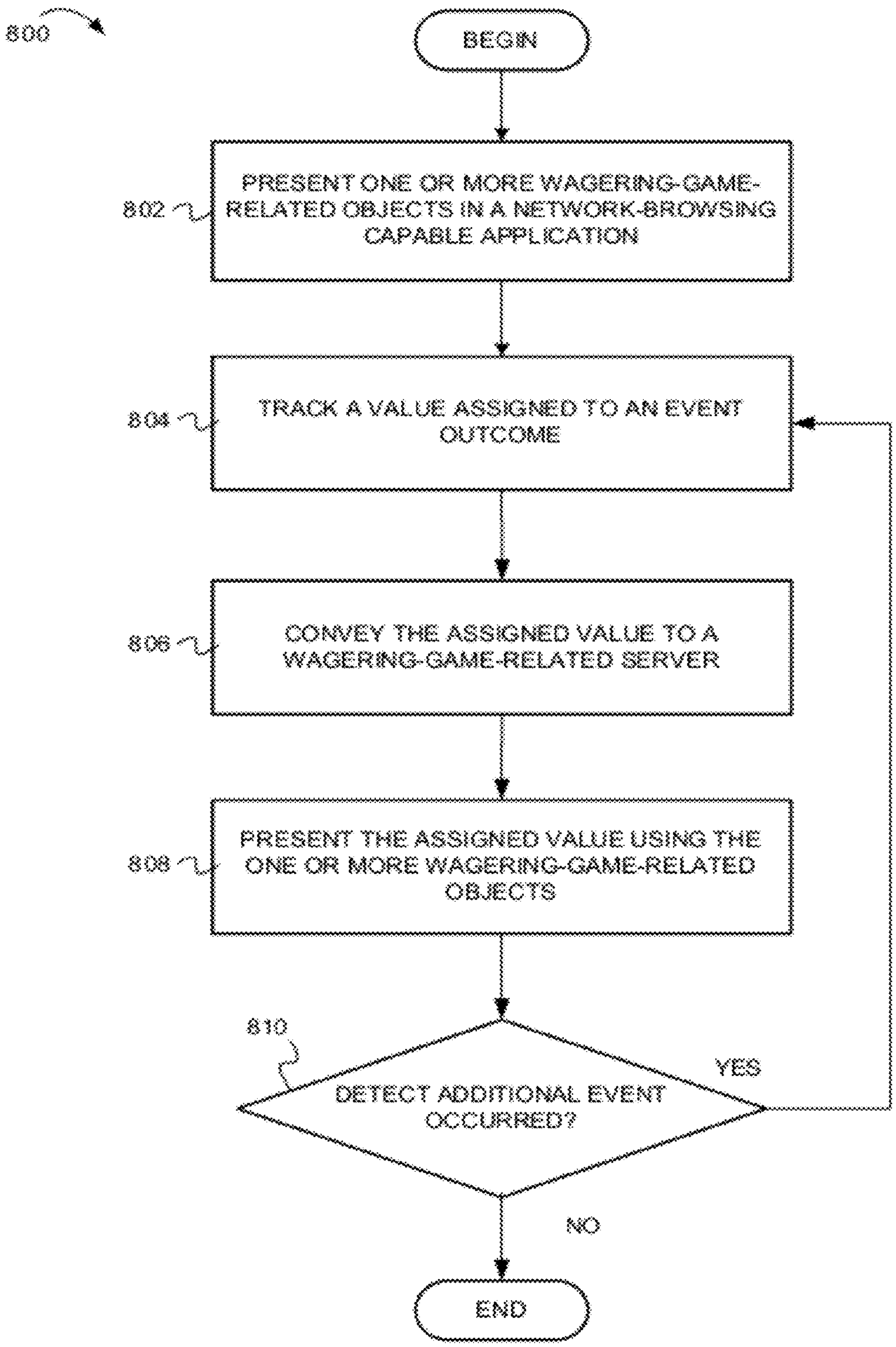
FIG. 8 is a flow diagram 800 illustrating controlling wagering-game-related objects and content in a network-browsing capable application, according to some embodiments of the invention.

FIG. 8 is a flow diagram illustrating controlling wagering-game-related objects and content in a network-browsing capable application, according to some embodiments of the invention. In FIG. 8, the flow 800 begins at processing block 802, where a browser device presents one or more wagering-game-related objects in a network-browsing capable application. The wagering-game-related objects can include buttons, dropdowns and toolbars, such as those shown in FIG. 7 and FIG. 9.

In FIG. 8, the flow 800 continues at processing block 804, where the browser device tracks a value assigned to an event outcome. In some embodiments, the event is a not related directly to wagering games, as shown in FIG. 9. Referring to FIG. 9, for example, the browser device can present wagering-game-related objects, like buttons 906, that allow a first user (e.g., "BIGBADBOY") to query the wagering game server to determine whether a second user (e.g., "ACE1025") is currently online (i.e., logged on). The browser device can indicate whether the second user is online, and if so, the browser device can allow the first user to interact with the second user. For example, the first user could challenge the second user to engage in an entertainment activity or event, like a board game, trivia games, etc. The entertainment activity or event can result in a "win" outcome for one of the users. The outcome could add points to a user's wagering-game account and add those points to a total point amount shown on the wagering-game-related objects. The points can represent values assigned to events based on outcomes between the competing users. The user who won the points could then log in to a wagering-game-related network site, such as that shown in FIG. 7. The user could then use the points for wagering-game-related activities. Similarly, the user could visit a casino, similar to casino 220 described in FIG. 2 above. The user could use the points for wagering-game-related activities in the casino 220.

In FIG. 8, the flow 800 continues at processing block 806, where the browser device conveys the assigned value to a wagering-game-related server. Referring back to FIG. 9, the wagering-game-related objects could convey the increase or decrease in points back to the wagering game server and write the point total to the user's account.

In FIG. 8, the flow 800 continues at processing block 808, where the browser device presents the awarded value using the one or more wagering-game-related objects. In FIG. 9, a wagering-game-related object displays points.

In FIG. 8, the flow 800 continues at processing block 810, where the browser device detects the occurrence of additional event outcomes that affect the assigned value. In other words, the browser device can periodically check to determine outcomes that could affect the assigned value, such as additional outcomes that might add or subtract more points, and accordingly repeat any portion of the flow 800.

Figure 10:
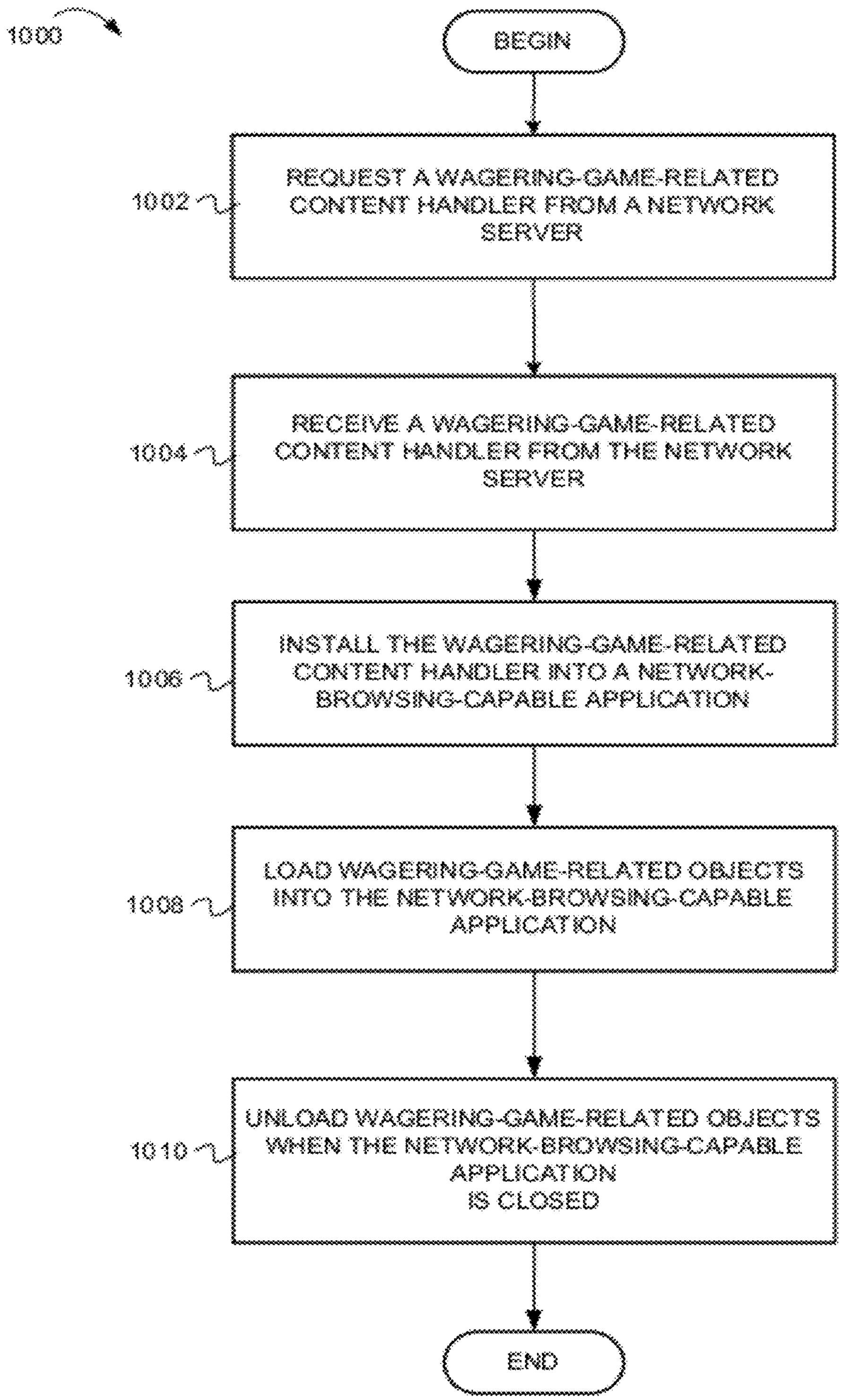
FIG. 10 is a flow diagram 1000 illustrating controlling wagering-game-related objects in a network-browsing capable application, according to some embodiments of the invention.

FIG. 10 is a flow diagram illustrating controlling wagering-game-related objects in a network-browsing capable application, according to some embodiments of the invention. In FIG. 10, the flow 1000 begins at processing block 1002, where a browser device requests a wagering-game-related content handler from a network server. The wagering-game-related content handler can be an add-in or a plug-in that can install a toolbar, buttons, or other wagering-game-related objects. In some embodiments, requesting a wagering-game-related content handler from a wagering game content server is an optional process. The wagering game content server could instead push the wagering-game-related content handler.

In FIG. 10, the flow 1000 continues at processing block 1004, where the browser device receives a wagering-game-related content handler from the wagering game content server.

In FIG. 10, the flow 1000 continues at processing block 1006, where the browser device installs the wagering-game-related content handler into a network-browsing-capable application. In some embodiments, a wagering-game-related content handler manager installs the wagering-game-related content handler into a network-browsing-capable application. The network-browsing-capable application could be any software application that can browse network sites. For example, the network-browsing-capable application could be a generic browser application configured principally for browsing networks, like the Internet. In other embodiments, however, the network-browsing-capable application could be any application or helper application that could receive and display content from a server device (e.g., role-playing games and social-network community access software, email or instant-messaging client software, etc.).

In FIG. 10, the flow 1000 continues at processing block 1008, where the browser device loads wagering-game-related objects into the network-browsing-capable application. For example, when the network-browsing-capable application is initially run, it can load the wagering-game-related objects (e.g., a toolbar) into the application for use.

In FIG. 10, the flow 1000 continues at processing block 1010, where the browser device unloads wagering-game-related objects from the network-browsing-capable application. For example, when the network-browsing-capable application is closed, the browser device can unload the wagering-game-related objects.

Figure 11:
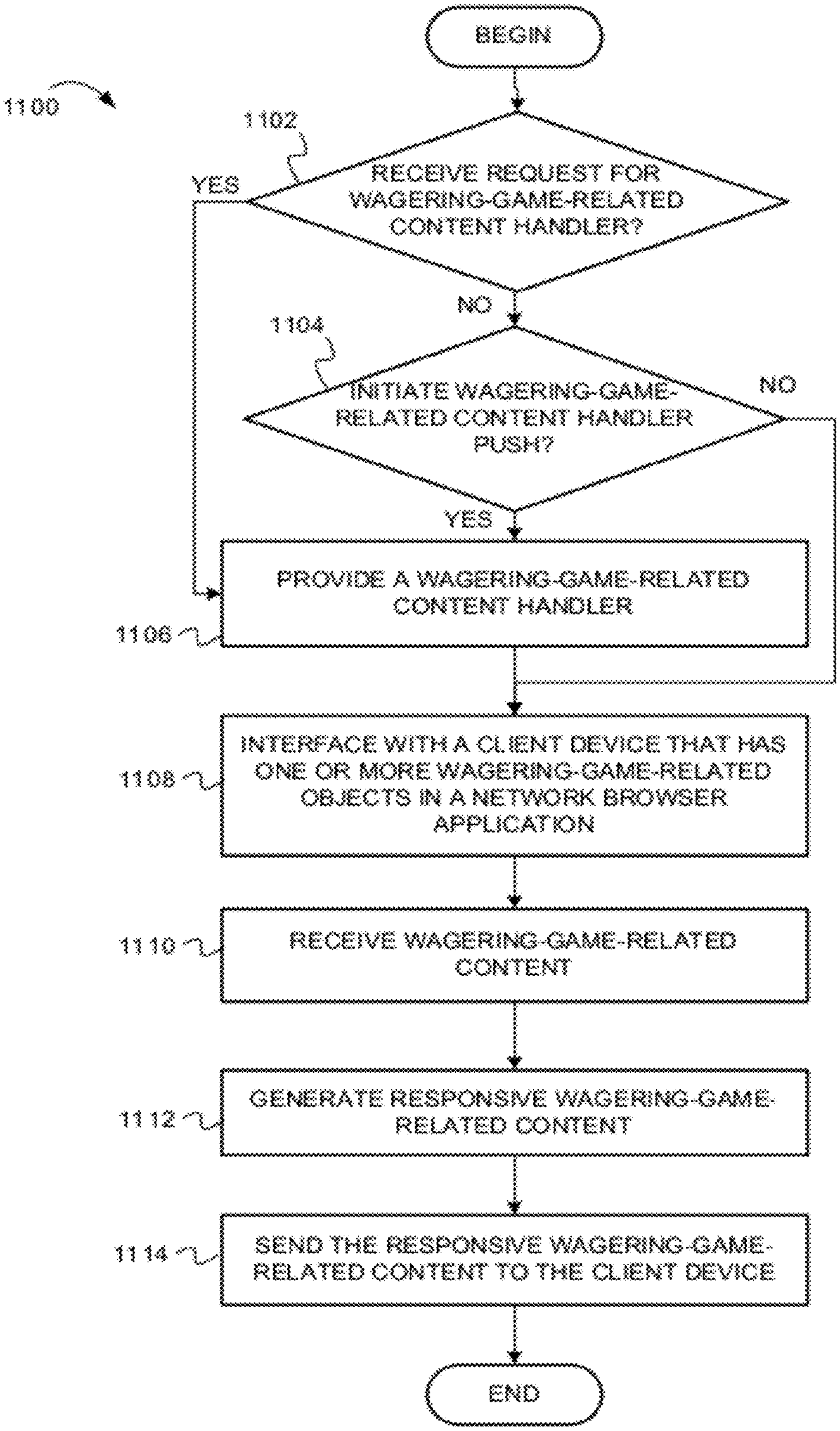
FIG. 11 is a flow diagram 1100 illustrating controlling wagering-game-related content and content handlers in a wagering game server, according to some embodiments of the invention.

FIG. 11 is a flow diagram illustrating controlling wagering-game-related content and content handlers in a wagering game server, according to some embodiments of the invention. In FIG. 11, the flow 1100 begins at processing decisional block 1102, where a wagering game content server can receive a request for a wagering-game-related content handler. If the wagering game content server receives a request for a wagering-game-related content handler, then the method 1100 moves to processing block 1106, described below. If, however, the wagering game server does not receive a request for a wagering-game-related content handler, then the method continues to processing block 1104.

In FIG. 11, at block 1104, the wagering game content server initiates a wagering-game-related content handler push. The wagering-game server can push a wagering-game-related content handler to a client device, even if the client device does not specifically request it. If the server does initiate a push, then the method 1100 continues at the next process block 1106. Otherwise, the method 1100 continues at processing block 1108.

At block 1106, the wagering game content server provides the wagering-game-related content handler. The wagering-game-related content handler can be sent as an executable file, a plug-in, a service, etc., via a communication network. The wagering-game-related content handler can be saved to a client device and installed directly onto the client device. In some embodiments the wagering-game-related content handler installs wagering-game-related objects into network-browsing-capable application.

In FIG. 11, the flow 1100 continues at processing block 1108, where the wagering game content server interfaces with a client device that has one or more wagering-game-related objects in a network-browsing-capable application.

In FIG. 11, the flow 1100 continues at processing block 1110, where the wagering game content server receives wagering-game-related content, such as server content requests, database queries, log-in requests, point value additions or deductions, or any other types of content described herein.

In FIG. 11, the flow 1100 continues at processing block 1112, where the wagering game server generates responsive wagering-game-related content. Responsive wagering-game-related content can include games, reciprocal point value totals, responses to queries, or any content responsive to the content received at block 1110

In FIG. 11, the flow 1100 continues at processing block 1114, where the wagering game content server sends the responsive wagering-game-related content to the client device. The client device can pass that content on to a browser device. The browser device can display at least some of the content using wagering-game-related objects.

Figure 13:
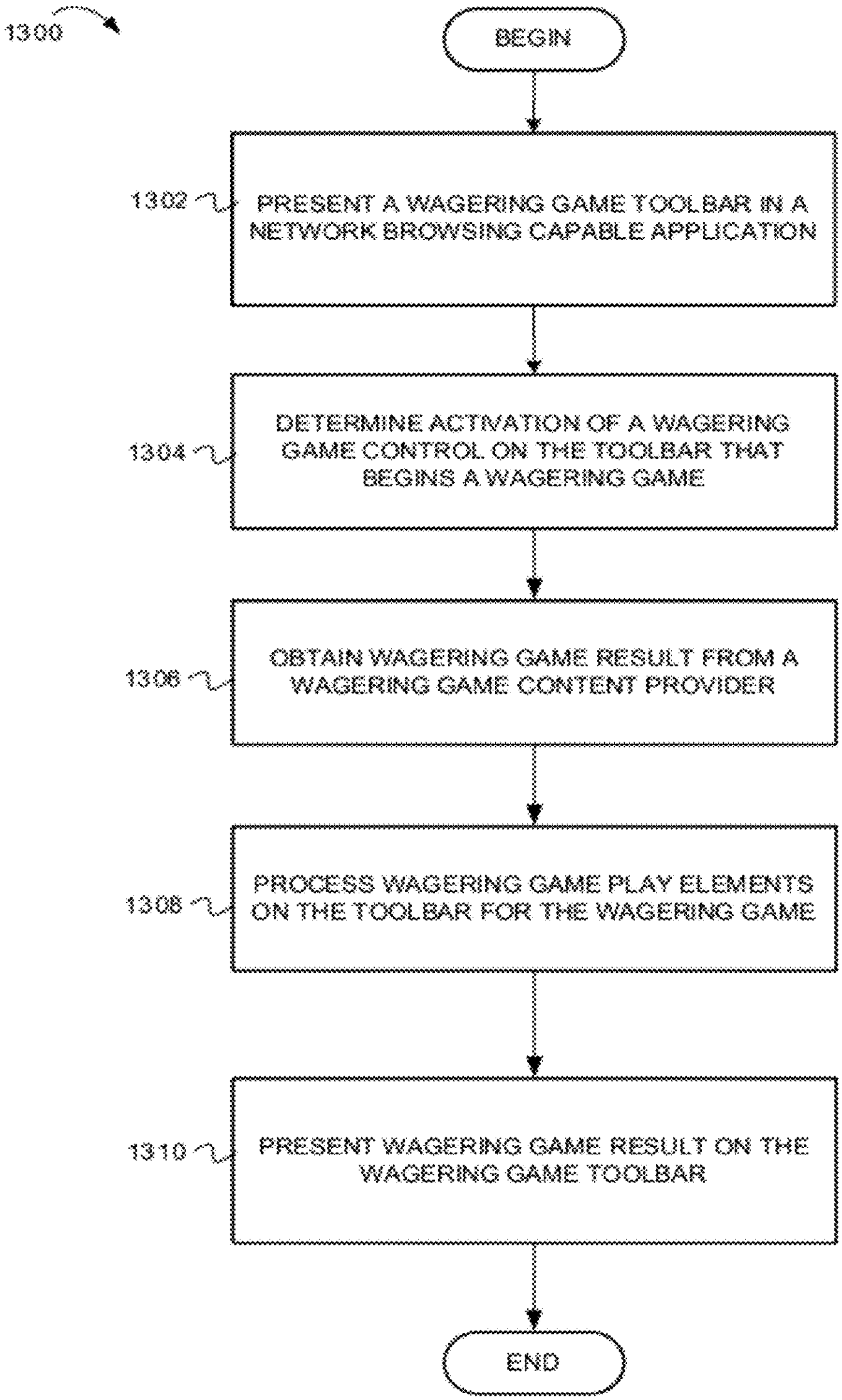
FIG. 13 is a flow diagram 1300 illustrating using a wagering game toolbar, according to some embodiments.
Figure 14:
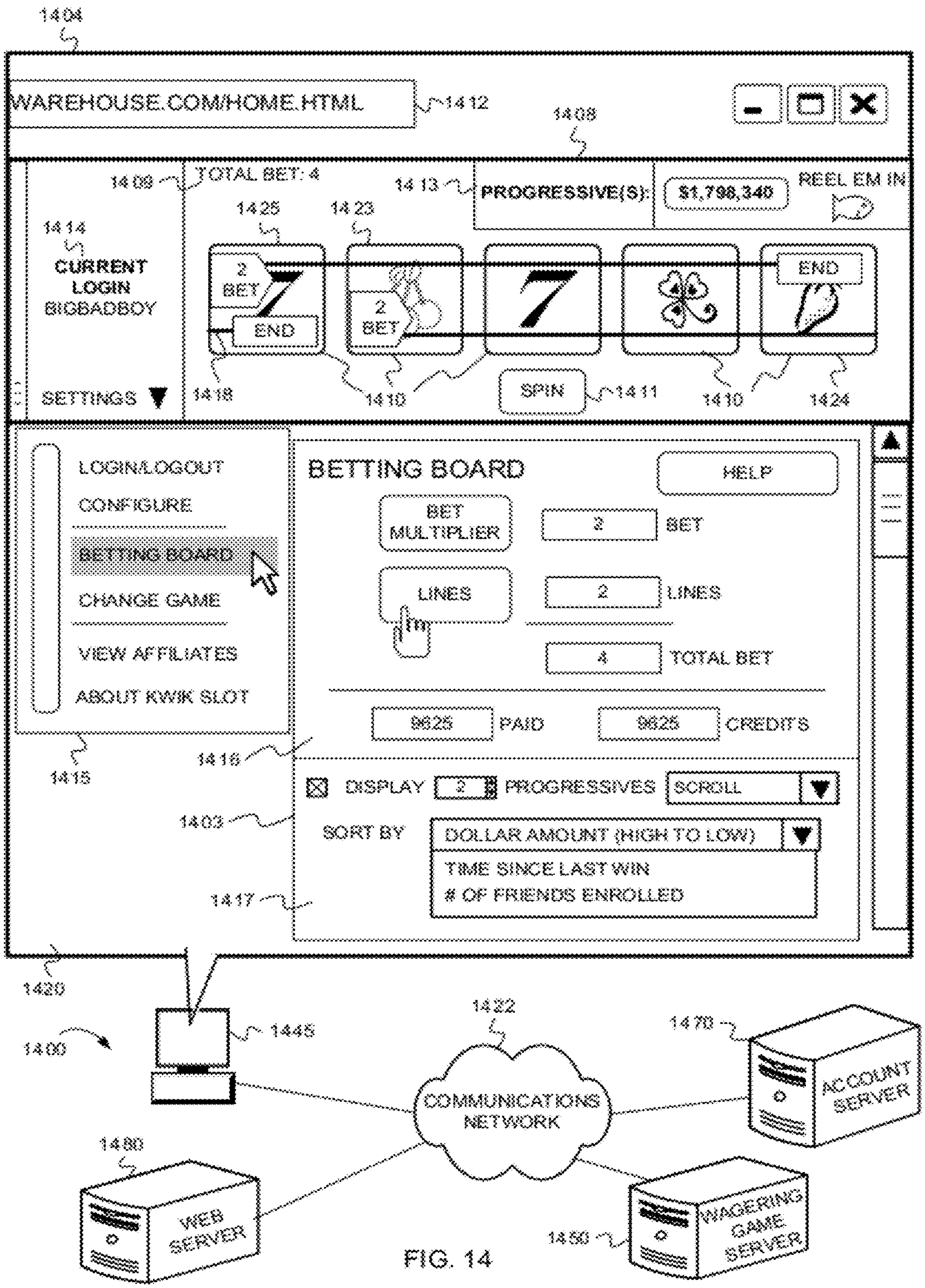
FIG. 14 is an illustration of a wagering game system 1400, according to some embodiments.

FIG. 13 is a flow diagram illustrating using a wagering game toolbar, according to some embodiments. FIG. 14 is a conceptual diagram that helps illustrate the flow of FIG. 13, according to some embodiments. This description will present FIG. 13 in concert with FIG. 14. In FIG. 13, the flow 1300 begins at processing block 1302, where a wagering game system ("system") presents a wagering game toolbar in a network browsing capable application. The wagering game toolbar can include wagering game play elements and wagering game controls, such as wagering game icons, graphics, buttons, etc. FIG. 14, illustrates an example of a wagering game toolbar 1408. In FIG. 14, a system 1400 includes a computer 1445 connected, via a communications network 1422, to an account server 1470, a wagering game server 1450, and a web server 1480. The computer 1445 can run a network browsing capable application, like the browser 1404. The browser 1404 can include the wagering game toolbar 1408 displayed in an auxiliary section of the browser 1404. A main section 1420 of the browser 1404 can display content received from the web server 1480. The web server 1480 can provide content from any source on the Internet (e.g., an online retailer, a gaming website, a search engine, a social network, etc.). The address bar 1412 can include a website address for the web server 1480. The wagering game toolbar 1408 includes one or more game play icons 1410 that can be used to present a wagering game within the wagering game toolbar 1408. The wagering game toolbar 1408 can change the game play icons 1410 to appear differently, emulating the game play elements used during a wagering game. For example, in some embodiments, the game play icons 1410 can represent the reel images of a video slot reel. In other embodiments, the game play icons 1410 can represent cards in a hand of video poker, keno balls, and/or other play elements in other wagering games. The game play icons 1410 can be any number of icons that fit within the wagering game toolbar 1408, or within any associated extensions (e.g., drop-downs, pop-up, frames, grids, panels, etc.) of the wagering game toolbar 1408. Extensions of the wagering game toolbar can be considered part of the wagering game toolbar 1408 because they originate from the wagering game toolbar 1408 as a result of activity that occurs within, or that is activated from, the wagering game toolbar 1408. In some embodiments, the wagering game toolbar 1408 can scroll, automatically or manually, to present more information. Further, the objects and information presented on the wagering game toolbar 1408 can periodically change to show more information. In some embodiments, the wagering game toolbar 1408 can have controls near the wagering game icons 1410, such as the "spin" control button 1411. In other embodiments, however, the wagering game toolbar can have controls within the extensions to the wagering game toolbar 1408.

The wagering game toolbar 1408 can have settings 1415 that present various options, configurations, etc. One of the settings 1415 can change the game that is displayed within the wagering game toolbar 1408. As a result, the system 1400 can cause the game play icons 1410 to change based on a selected wagering game. The settings 1415 can be in an extension, such as a drop-down, but can also be located in other places away from the wagering game toolbar 1408, such as in options associated with the browser 1404, in a configuration file, in an operating system component, etc. The settings 1415 can cause additional extensions to appear, such as a game play panel 1403, which can configure and/or control wagering games within the wagering game toolbar 1408. The game play panel 1403 can include game controls, betting controls, help menus, payout charts, login items, credit meters, payment meters, game statistics, progressive game information, bonus game information, etc. The game play panel 1403 can have multiple parts. For example, the game play panel 1403 includes a betting panel 1416 and a progressive game panel 1417. In the betting panel 1416 are various controls that can place bets, multiply bets, set bet pay lines, etc. The bet amounts can be displayed in the wagering game toolbar 1408 as a meter 1409. The pay lines settings can set one or more pay lines associated with the wagering game. The wagering game toolbar 1408 can display the pay lines, such as pay line 1418. The pay line 1418 is an example of a wrap-around pay line, according to some embodiments. The wrap-around pay line 1418 monitors icon combinations along the line starting from the second icon 1423 from the left, extending through to the last icon on the right 1424, then wrapping around the icons back to the first icon 1425 from the left. The five icons, beginning on the second icon 1423, following the pay line that wraps around to the first icon 1425, represent a five by one (5×1) matrix of icons for which wagering game play icons 1410 can line up in a winning combination. The wrap-around pay line can begin on any of the icons and end on any adjacent icon. Because there are five icons 1410 shown, the wagering game toolbar 1408 can have five wrap-around pay lines. The wagering game toolbar 1408, however, can have other types of pay lines, such as rows of continuous icons starting from any one icon and ending on another (e.g., from the first icon, to the third icon), but not wrapping around, scatter reel pay lines, where any scattering of icons can win and does not necessarily have to be in a row, etc. The system 1400 can determine pay line setting values set within the betting panel 1416 and provide the pay line values to the wagering game server 1450. The wagering game server 1450 can provide the computer 1445 with multiple wagering game results, which the wagering game toolbar 1408 can present for any of the pay lines set within the betting panel 1416. The wagering game toolbar 1408 can present an animation, or other type of congratulatory display, for any winning pay line.

The progressive game panel 1417 can display progressive game settings related to wagering games with progressive awards (e.g., progressive jackpots). The progressive game settings can control a progressive display section 1413 on the wagering game toolbar 1408, that shows progressive game information (e.g., any number of progressive jackpot meters showing a running, real-time count of an amount to be won by a progressive jackpot, game branding graphics showing what game is associated with the progressive jackpot, etc.). The wagering game toolbar 1408 can detect when a player selects the progressive game information and cause some activity to occur, such as cause the progressive game to appear on the wagering game toolbar 1408 and/or on an extension, cause the main display section 1420 to display the progressive game, etc. The progressive game settings within the progressive game panel 1417 can specifically determine how the progressive game information is displayed. For example, the progressive game settings can determine a number of progressive game meters that are displayed at any given time, how the meters appear within the progressive game section 1413 (e.g., as scrolling tickers, as banner icons that fade in and out, etc.), any special indicators (e.g., light, shaking, etc.) for progressives that have not hit in a specified amount of time, how the progressive game meters are sorted (e.g., by game type, by highest to lowest jackpot amounts, by amounts of time most over an average time to hit a jackpot, by amounts of time not hitting the jackpot, by casino provider, by how many players have played the progressive game within a specified period of time, by how many friends or social contacts that have played the progressive game, etc.). In some embodiments, the progressive game panel 1417 can track progressive games from different casinos. For example, the progressive settings can watch for progressive games from online casinos and brick-and-mortar casinos (e.g., "concrete" or "material" casinos with actual buildings or facilities). When displaying progressive game information in the progressive display section 1413, the system 1400 can display indicators (e.g., messages, different branding, specific background colors, etc.) that distinguish online progressive games from games that are in a brick-and-mortar casino. The system 1400 can detect a player's preferences and determine which brick-and-mortar casinos that are closest to the player's residence, and present maps to wagering game machines, within those casinos, which have the progressive game. The system 1400 can also detect, based on a network identifier (e.g., an IP address), the current location of the computer 1445, and present brick-and-mortar casinos that are closest to that current location. In some embodiments, the system 1400 can provide alerts that indicate when a progressive game jackpot reaches a certain value. The system 1400 can also perform side betting on progressive games, and/or perform other operations related to progressive wagering games. In some embodiments, instead of having a progressive display section 1413 on the wagering game toolbar 1408, the system 1400 can have a separate, stand-alone progressive toolbar. The separate toolbar can be bundled with applications other than the wagering game toolbar 1408.

The settings 1415 can also show login information 1414. The login information 1414 can include account identification information of a player that is logged in to a wagering game account. The wagering game toolbar 1408 can present login controls (not shown) to login the player to the wagering game server 1450, the account server 1470, or both. In some embodiments, the player can be pre-logged in, for example, by using an operating system's login information, or by having login information stored in the system 1400 so that the wagering game toolbar 1408 automatically logs a player in to the wagering account when the browser 1404 is launched. The settings 1415 can also configure the wagering game toolbar 1408 to display wagering games and/or other casino activity (e.g., replays of games, available games, openings in a game tournament, invitations to game challenges, etc.), information about friends and social contacts (e.g., whether the friends are logged in to the casino network, whether the friends are playing in a tournament, etc.), information on side-betting, etc. The settings 1415 can configure the wagering game toolbar 1408 to perform, or stop performance of, certain actions, such as automatically betting on whether individuals will win a wagering game, automatically folding hands, instantly notifying a player when a specific hand or game play icon configuration appears, automatically repeating spins, pausing set actions after a big win, etc.

The wagering game toolbar 1408 can be configured in many different ways other than the example shown in FIG. 14. For example, the wagering game toolbar 1408 can be configured to scroll information instead of displaying information in a static fashion. The game play icons 1410 can appear to spin on the wagering game toolbar 1408. The control button 1411 can be draggable, removable, associated with a secondary input (e.g., keyboard key), etc. In another example, the wagering game toolbar 1408 can be configured to toggle between a wagering mode and a non-wagering mode. For instance, the system 1400 can determine a secondary input that toggles the objects on the wagering game toolbar 1408 from a "cash" mode, which places wagers on the wagering game, to a "fun" mode, which does not use cash as a wager, causing the game play icons 1410 to activate without a wager. An example of a secondary input can be a keyboard key combination (e.g., a control button+left mouse click causes a wagering mode, where a left mouse click is a non-wagering mode default). The system 1400 can tally points for both wagering modes and non-wagering modes.

The flow 1300 continues at processing block 1306, where the system obtains a wagering game result from a wagering game content provider. The wagering game content provider can provide wagering game results (e.g., wins, losses, bonus rounds, jackpots, etc.). The wagering game provider can transmit the wagering game results across a wide area network from a wagering game server to a client device that includes the toolbar.

The flow 1300 continues at processing block 1308, where the system processes the wagering game play elements on the toolbar for the wagering game. Based on the wagering game result, the system causes the wagering game play elements to appear in a specific configuration. For example, the system can consult a payout chart that describes configurations for the wagering game play elements and then arrange the wagering game play elements according to a configuration that matches the wagering game result. In some embodiments, the wagering game result can include results for both the wagering game and for one or more bonus games. For example, the wagering game provider can include a bonus award in place of, or in addition to, a wagering game result. In some embodiments, the system can present bonus displays, such as pick-field bonus rounds where the player can select from a grid of bonus icons. The system can present bonus pop-up and/or drop down displays. The system can present configurations and controls that can save bonuses in a player profile, then access, share, redeem, trade-in, or exchange bonus awards (e.g., exchange 5 free spin bonuses for an invitation to a game tournament). The system can send notifications to the player and/or to a player's social contacts about the bonus awards. The system can also present links from the wagering game toolbar to other websites where the player can view, redeem, or otherwise use the bonus awards.

The flow 1300 continues at processing block 1310, where the system presents the wagering game result on the wagering game toolbar. The system can present the wagering game result using one or more toolbar objects, such as the wagering game play elements. The system can also utilize the wagering game toolbar to present the bonus awards, progressive awards, etc. For example, FIGS. 15 and 16 below illustrate one example of presenting a bonus award using the wagering game toolbar.

Figure 15:
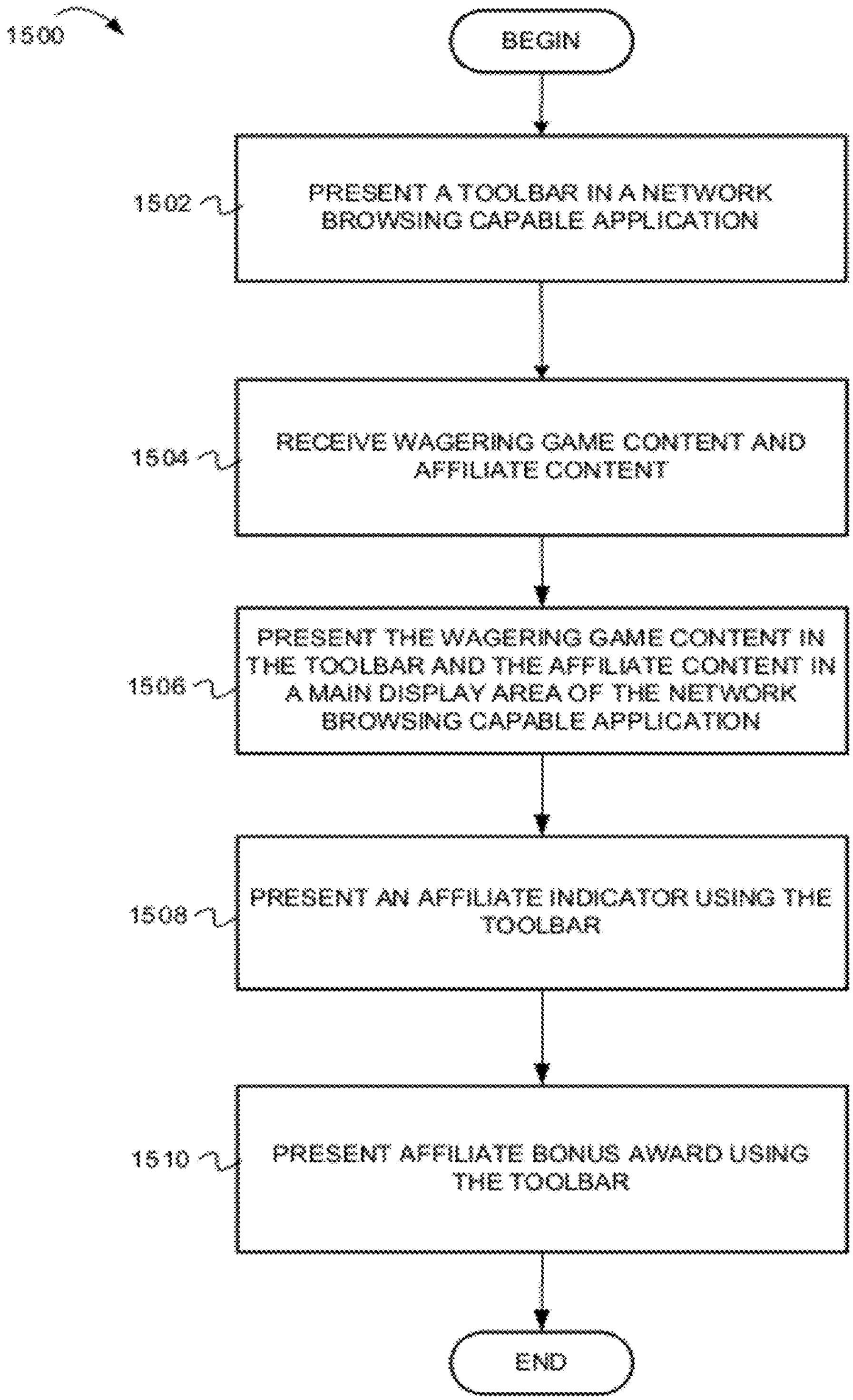
FIG. 15 is a flow diagram 1500 illustrating using online wagering game provider affiliations with a wagering game toolbar, according to some embodiments.
Figure 16:
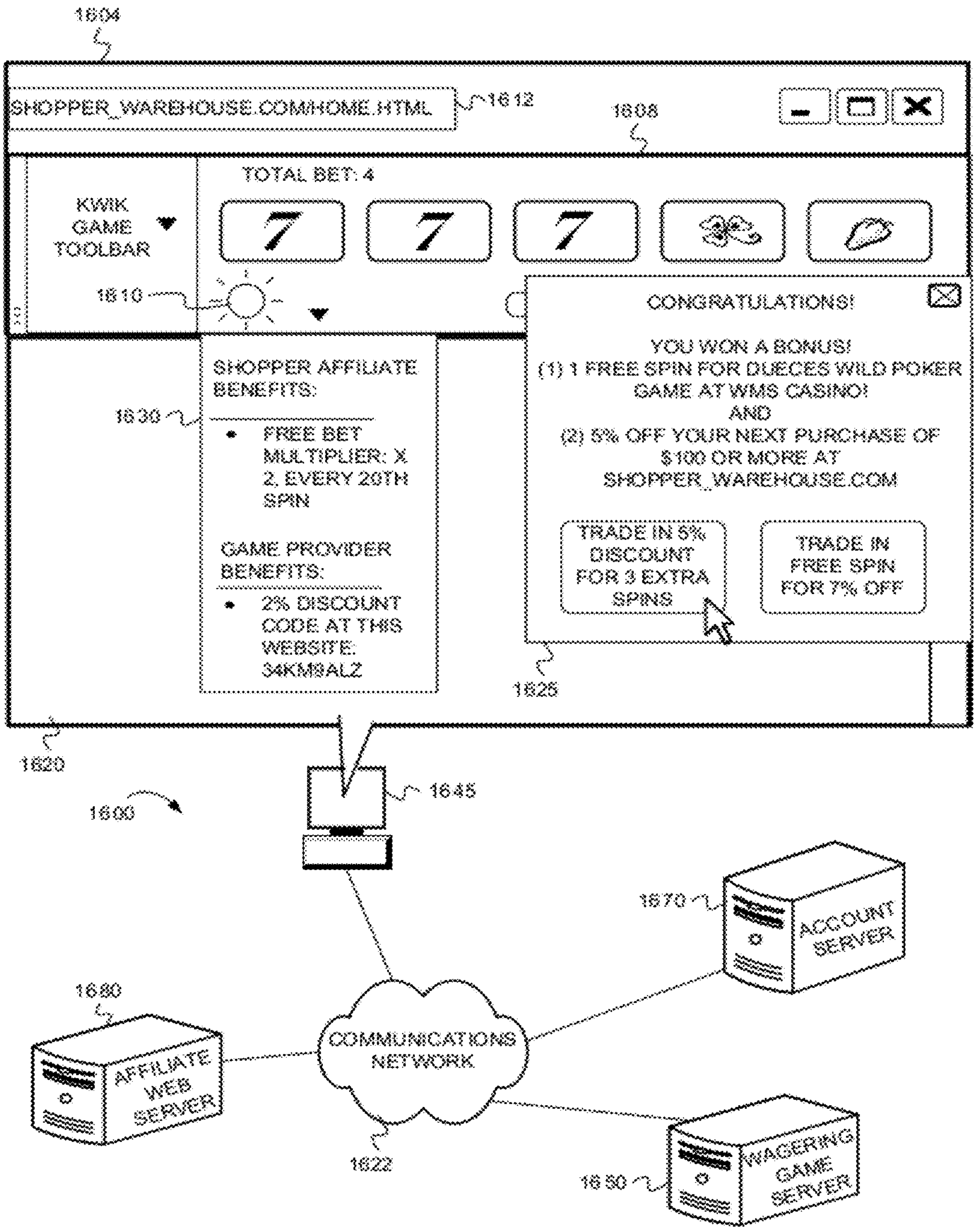
FIG. 16 is an illustration of a wagering game system 1600, according to some embodiments.

FIG. 15 is a flow diagram illustrating using online wagering game provider affiliations with a wagering game toolbar, according to some embodiments. FIG. 16 is a conceptual diagram that helps illustrate the flow of FIG. 15, according to some embodiments. This description will present FIG. 15 in concert with FIG. 16. In FIG. 15, the flow 1500 begins at processing block 1502, where a wagering game system ("system") presents a toolbar in a network browsing capable application. FIG. 16 illustrates an example wagering game toolbar 1608 that can be used in conjunction with an affiliate content provider. In FIG. 16, a system 1600 includes a computer 1645 connected to a communications network 1622. Also connected to the communications network 1622 are a wagering game server 1650, an account server 1670, and an affiliate web server 1680. The computer 1645 can present a browser 1604 with a wagering game toolbar 1608. The wagering game toolbar 1608 is similar to the wagering game toolbar 1408 presented in FIG. 14. The wagering game toolbar 1608 presents wagering games and information associated with wagering games.

The flow 1500 continues at processing block 1504, where the system receives wagering game content and affiliate content. An affiliate can be a web-based partner that works with a wagering game provider to cross-market services, products, etc. The affiliate can incentivize potential wagering game players to use the wagering game provider's website, casino facilities, gaming machines, service providers, other affiliates websites, and/or wagering game toolbars. Likewise, the wagering game provider can, via the wagering game toolbar, work in conjunction with the affiliate's content to present incentives, awards, etc., that can encourage use of the wagering game toolbar and/or to support (e.g., patronize) the affiliate's website, facilities, services providers, etc. Affiliates can be any online entity and/or service that are associated with the wagering game provider, such as online gaming websites, casinos, online retailers, social network websites, etc. Affiliates can also be individuals that post on blogs, personal websites, etc. The individual type affiliates can also refer potential wagering game players to the wagering game provider, and vice versa. In some embodiments, some affiliates (e.g., individual affiliates) can receive points, or other awards redeemable by the wagering game provider, for referring potential players to the wagering game provider (e.g., via use of the toolbar, via an affiliate's website, etc.). In other embodiments, some affiliates (e.g., business affiliates) can receive some portion of profits (e.g., a percentage of wagering game losses) from wagering game players that were referred to the wagering game provider. In FIG. 16, the computer 1645 receives wagering game content from the wagering game server 1650. The computer 1645 also receives affiliate content from the affiliate web server 1680. The computer 1645 can receive the content in various ways, such as via satellite signals, through a wide-area computer network, through radio signals (e.g., in the case of a wireless device), etc. The browser 1604 can include an address bar 1612 for a network address to the affiliate web server 1680. When the browser 1604 accesses the network address for the affiliate web server 1680, the affiliate web server 1680 provides content (e.g., web page files) pertinent to the affiliate's website. The browser 1604, via the computer 1645, can also request wagering game content from the wagering game server 1650. The affiliate web server 1680 can respond by sending the computer 1645 control information and game content that the computer 1645 can process and present.

The flow 1500 continues at processing block 1506, where the system presents the wagering game content in the wagering game toolbar and the affiliate content in a main display area of the network browsing capable application. For example, in FIG. 16, the browser 1604 can present the affiliate's content (e.g., from the affiliate web server 1680) in the main display 1620 of the browser 1604. Concurrently, the browser 1604 can present the wagering game content in the wagering game toolbar 1608, in similar ways to those described in FIGS. 13, 14, and elsewhere herein.

The flow 1500 continues at processing block 1508, where the system presents an affiliate indicator using the toolbar. In FIG. 16, the wagering game toolbar 1608 includes an affiliate indicator 1610. The affiliate indicator 1610 can indicate when the browser 1604 is accessing an affiliate content provider, or in other words, when the affiliate web server 1680 provides content to the browser 1604. The affiliate indicator 1610 can indicate when the browser 1604 is accessing and/or displaying content from the affiliate web server 1680 within the main display 1620. The affiliate indicator 1610 can determine that the affiliate web server 1680 is an online affiliate of the wagering game provider in various ways. For example, the wagering game toolbar 1608 can be created by, or distributed by, the affiliate web server 1680 and thus be pre-configured to determine when the affiliate web server 1680 is being accessed. In some embodiments, the affiliate indicator 1610 can detect that the affiliate web server 1680 is an affiliate by accessing a table, associated with the wagering game server 1650, which lists all affiliates of the wagering game provider. Further, in some embodiments, the affiliate indicator 1610 can detect that the affiliate web server 1680 is an affiliate by detecting an electronic signal and/or a script embedded within the content provided by the affiliate web server 1680. The affiliate indicator 1610 can indicate the affiliate in different ways. For example, the affiliate indicator 1610 can blink, change color, or perform other graphical effects to indicate that the website being visited is a wagering game provider affiliate website. The affiliate indicator 1610 can also present sounds. The affiliate indicator 1610 can also work in conjunction with other parts of the browser (e.g., the main display 1620, dropdowns, as pop-ups, etc.), with web widgets, etc. The affiliate indicator 1610 can indicate that the affiliate website can provide an award, or bonus, for playing the wagering game toolbar 1608 while visiting the affiliate's website and/or by performing specific actions while at the affiliate's website (e.g., the affiliate bonus becomes available when the player (a) makes a purchase from the website, (b) clicks on a certain number of links, (c) signs up for the affiliate's newsletter, (d) creates an account at the affiliate website, etc.). In some embodiments, the affiliate indicator 1610 can display promotions and/or cross-marketing benefits. For example, the affiliate indicator 1610 presents a drop-down display 1630 that shows benefits for playing the wagering game toolbar 1608 while visiting the affiliate's website (e.g., a free game spin, a bet multiplier increase, etc.). Likewise, the drop-down display 1630 can show benefits for visiting and/or using the affiliate's website (e.g., a coupon code). In some embodiments, the system 1600 can accept a bonus code provided via an affiliate's purchase receipt. For example, a player may visit an affiliate retail store and receive a purchase receipt with a bonus code printed on it. The browser 1604 (e.g., the main display section 1620 and/or the wagering game toolbar 1608) can receive the bonus code, thus activating and/or enhancing the potential affiliate bonus.

The flow 1500 continues at processing block 1510, where the system presents the affiliate bonus award using the wagering game toolbar. For instance, in FIG. 16, when the content from the affiliate web server 1680 is presented in the main display 1620, the affiliate web server 1680 can provide an affiliate award for playing wagering games with the wagering game toolbar 1608. The system 1600 can present the affiliate award using an affiliate award display 1625. In some embodiments, the affiliate award display 1625 can also present a wagering game bonus (e.g., an award, a free spin, an invitation to a game tournament, entertainment points, etc.) concurrently with the affiliate award. The affiliate award display 1625 can also present options for the player to trade, or exchange, affiliate and wagering-game-provider bonuses, for greater awards by either the wagering game provider or the affiliate. The wagering game toolbar 1608 and/or the main display section 1620 can provide controls for redeeming the bonuses, if they are redeemable online. The system 1600 can also email, print, or in other ways document and/or notify the player, or others, of the bonus(es), so that the player can later redeem the bonus(es) when away from the browser 1604 and/or when the player is offline. In some embodiments, the affiliate bonus can be tiered (e.g., in tier 1 the system 1600 provides a 5% discount, in tier 2 the system 1600 provides a 10% discount, etc.), such as for progressive bonuses, standard bonuses, etc. For example, bonus games presented via the affiliate award display 1625 can utilize any techniques described above conjunction with FIGS. 13 and 14.

In FIGS. 15 and 16, affiliate marketing is described in conjunction with a wagering game toolbar. Other marketing types, however, according to other embodiments can also be used in conjunction with a wagering game toolbar. For example, a wagering game toolbar can be utilized in viral marketing (e.g., peer to peer marketing), search engine marketing, email marketing, etc. For instance, a social network may provide the wagering game toolbar, web widgets, etc., that a social network user can disseminate to social contacts. The social network and wagering game provider can utilize some of the techniques described above in conjunction with affiliates. For example, a toolbar manufacturer may create and provide a toolbar to a wagering game provider (e.g., a casino, an online wagering game site, etc.). The wagering game provider may offer the toolbar through their website for players to download and use. The player could pass a copy of the toolbar along to other players, or may be indicated as a reference when the other players access the toolbar from the wagering game provider. As a result, the player that referred the toolbar to the other players may get some form of reward for encouraging the use of the toolbar via the peer to peer sharing of the toolbar. This reward may be less than a standard business arrangement for profit sharing. For instance, a standard business agreement between affiliates may include a provision that the affiliate receives some large percentage of losses (e.g., 40% of losses) for a player that is referred to the wagering game provider. However, through a viral or peer-to-peer sharing, of the toolbar, the wagering game provider can provide less of a percentage and/or other awards or incentives for referring players to the wagering game provider. In some examples, the wagering game provider may provide, for the referral, incentives and awards such as a set dollar amount (e.g., $50 per referral), entertainment points, perks, social status points, invitations to exclusive games or tournaments, etc. As a player refers more players, the referring player's incentives may increase proportionately. If the players that were referred also refer their own players, then they can also receive incentives and awards. Plus, the original referring player may also receive a percentage of awards and incentives made by their referring players, similar to a multi-level marketing structure. In some embodiments, the system can provide custom awards, where the referring player can select what types of awards they receive. Some of those awards can avoid providing the player with awards associated with their referred friends' gambling losses. The system can provide awards that foster the social relationship between the players, such as group awards, awards based on a player's winnings, awards that enhance the referring player's social status (which can provide the player with greater access to high profile events to which they can invite other players), and so forth. The system can also pool awards and distribute the awards periodically, according to a calculation based on a variety of factors, such as a number of referred players, how active the referring player is playing wagering games, how active the referred players are playing wagering games, how many players those players have referred, etc.

Figure 17:
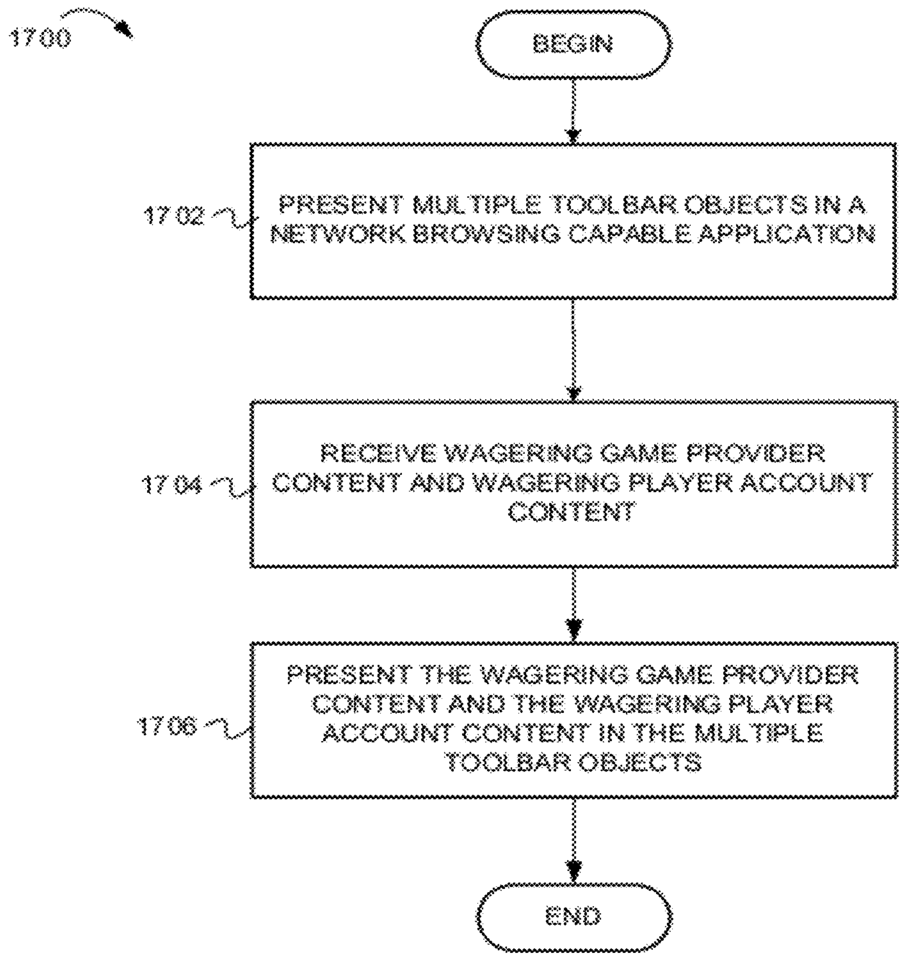
FIG. 17 is a flow diagram 1700 illustrating using a wagering game toolbar to interact with player accounts, according to some embodiments.
Figure 18:
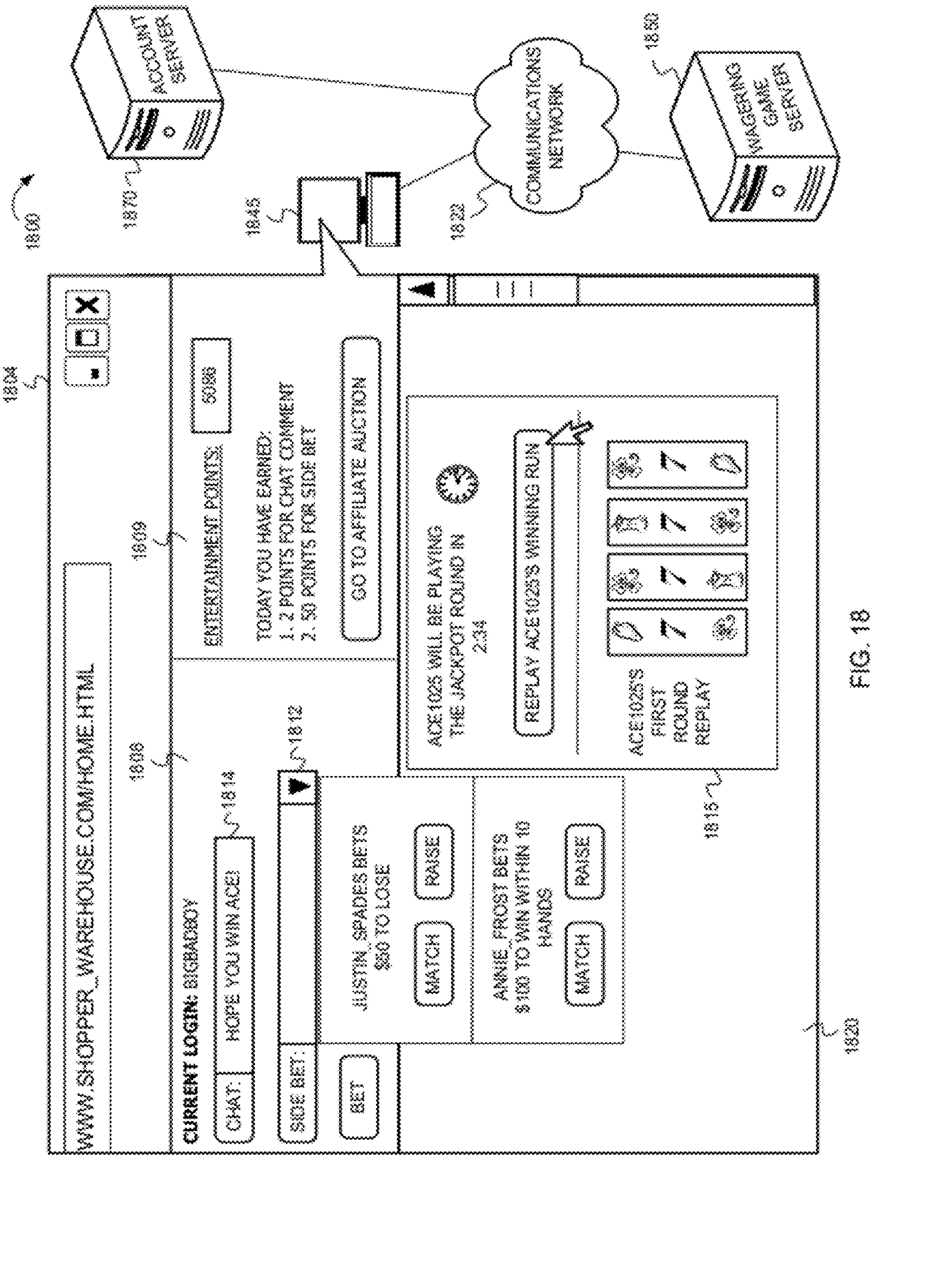
FIG. 18 is an illustration of a wagering game system 1800, according to some embodiments.

FIG. 17 is a flow diagram illustrating using a wagering game toolbar to interact with player accounts, according to some embodiments. FIG. 18 is a conceptual diagram that helps illustrate the flow of FIG. 17, according to some embodiments. This description will present FIG. 17 in concert with FIG. 18. In FIG. 17, the flow 1700 begins at processing block 1702, where a wagering game system ("system") presents multiple toolbar objects in a network browsing capable application. In some embodiments, multiple toolbar objects can display different wagering game information at the same time. For example, some toolbar objects can present wagering games (e.g., game play icons, control buttons, bonus displays, game replays, etc.), while other toolbar objects present related information, or rather, information that is related to a wagering game account or to a wagering game, but that is not a wagering game (e.g., game statistics, social contact information, login information, invitations, challenges, instant messages, game openings, notifications of a player accomplishing an accomplishment indicated in player preference settings, news feeds, stock tickers, player locations, player history, financial account information, calendaring, etc.). In some embodiments, the related information can include audience generated communication and activities provided by wagering game accounts logged into the system. Because the audience can be users logged into wagering game accounts, the audience interaction may be referred to herein as "wagering player account content" and/or "audience generated content". The audience generated content can relate to wagering games that are presented in toolbar objects or that are scheduled to appear on a wagering game toolbar.

The flow 1700 continues at processing block 1704, where the system receives wagering game provider content and wagering player account content. For example, in FIG. 18, a wagering game system ("system") 1800 includes a computer 1845 connected to a wagering game server 1850 and an account server 1870 via a communications network 1822. The wagering game server 1850 and account server 1870 can jointly, or individually, provide both wagering game content and wagering player account content to the computer 1845 to present in a browser 1804. The wagering player account content can include information that one or more audience members may contribute, via a first wagering game toolbar 1808. The wagering game content can include content that shows, or processes, wagers (e.g., side-bets) and wagering games (e.g., wagering game shows, wagering game replays, etc.). For instance, an audience member can use the first wagering game toolbar 1808 to perform and communicate as an observer while watching someone play, or waiting for someone to play, wagering games. The browser 1804 also includes a second wagering game toolbar 1809, that an observer can utilize for other wagering game related activities possibly different from (or related to) activities performed in the first wagering game toolbar 1808.

Returning momentarily to FIG. 17, the flow 1700 continues at processing block 1706, where the system presents the wagering game provider content and the wagering player account content in the multiple toolbar objects. For instance, in FIG. 18, the first wagering game toolbar 1808 can present information and communication tools related to a wagering game show, such as chat controls 1811, side-betting controls 1812, and a game show display 1815. At the same time, the second wagering game toolbar 1809 can present information related to a wagering player's account. The game show display 1815 includes a notice to watch a player (e.g., ACE1025) play a wagering game. For instance, a player (possibly known to the user of the computer 1845) may have had an exceptional run of luck on a wagering game and may have reached a "jackpot" round, where the player is eligible to play for a chance at winning a jackpot. The user (e.g., BIGBADBOY) of the computer 1845 may have a setting that indicates that the user would like to be notified when players reach a jackpot round. As a result, the system 1800 presents the notice within the game show display 1815. The notice can count down a specific amount of time until the player begins the jackpot round of the wagering game. During that time, the user controlling the browser 1804 can chat (e.g., using the chat controls 1811) with the player, or other audience members also waiting for the player to begin the game. Also during that time, audience members can place side bets (e.g., using the side-betting controls 1812) on how the player will perform in the upcoming jackpot round. The game play display 1815 can also show game replays, for instance, one or more of the player's rounds leading up to the jackpot round. In some embodiments, the system 1800 can give, or receive, replay "credits" that a user can spend to record, view, or otherwise use replays. Once the player begins the jackpot round, the game show display 1815 can display the player's actions in real-time. While activity occurs within the first wagering game toolbar 1808, the second wagering game toolbar 1809 can display other information, such as an accumulation of entertainment points and an invitation to spend points on an auction item. The points can be entertainment points that the user has earned. The second wagering game toolbar 1809 can also display points, or other awards, that the user earns from activities performed within the first wagering game toolbar 1808 (e.g., chatting, placing side-bets, watching replays, guessing outcomes, answering trivia questions, etc.). The second wagering game toolbar 1809 can also present a link to an auction website (e.g., an affiliate's website, the casino's website, etc.). The user can activate the link, which can cause an auction website to display, for instance, within the main display section 1820 of the browser 1804, within an extension to the second wagering game toolbar 1809, within both, or in other locations (e.g., using another application on the computer 1845, using another instance of the browser 1804, etc.). The auction website can use the points as bids on auctions for free spins, plays, merchandise, trips, and other products or services. The user can have settings that can generate notifications when there are sufficient points to bid on a desired item. Auctions are one example of a loyalty program that the system 1800 can effectuate using the wagering game toolbars 1808, 1809. The system 1800, however, can utilize other loyalty programs, other than auctions, that a user can spend entertainment points on, such as reward programs, customer support packages, discounts, status enhancements, avatar items, etc.

Figure 19:
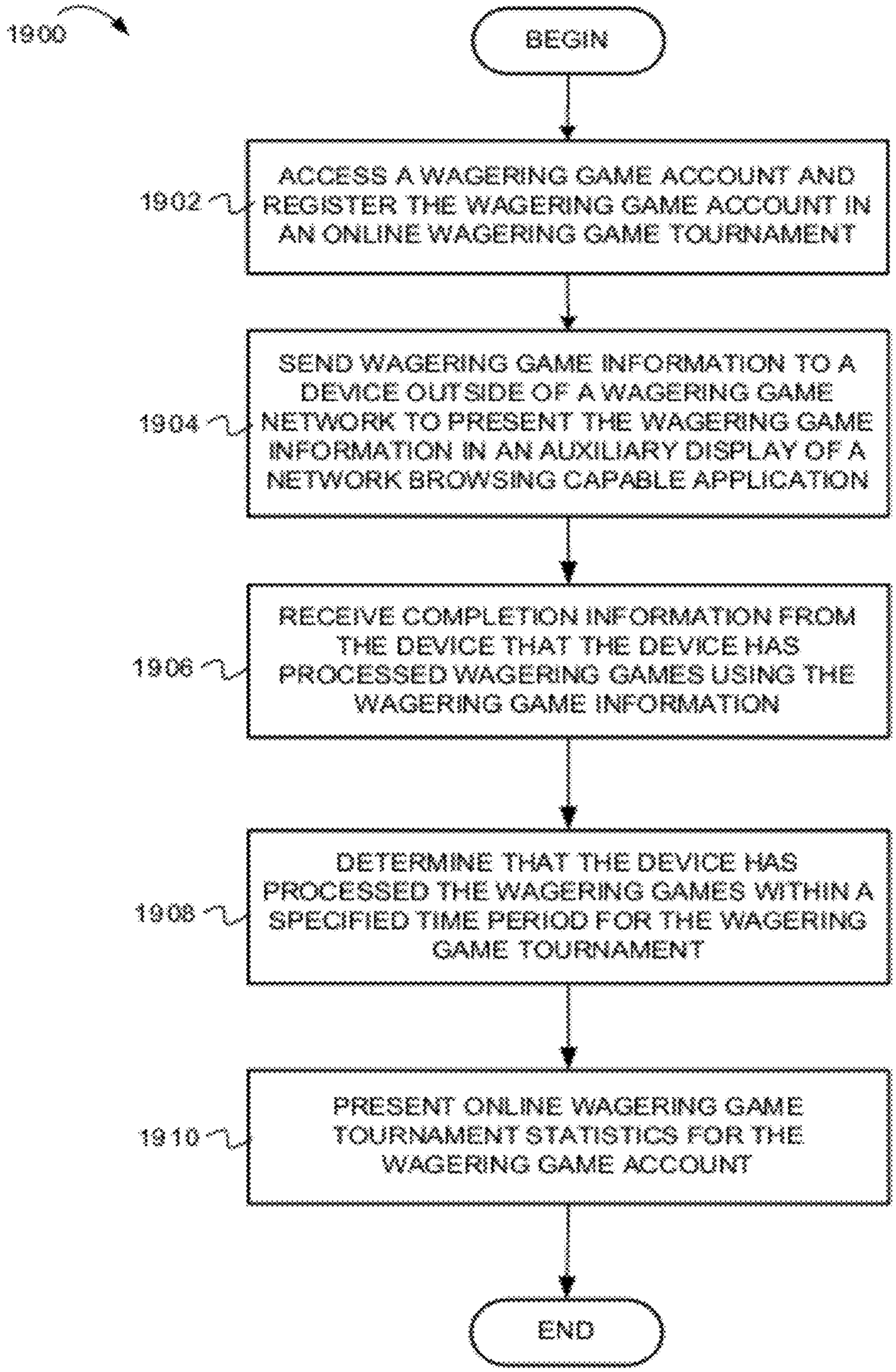
FIG. 19 is a flow diagram 1900 illustrating processing an online wagering game tournament, according to some embodiments.
Figure 20:
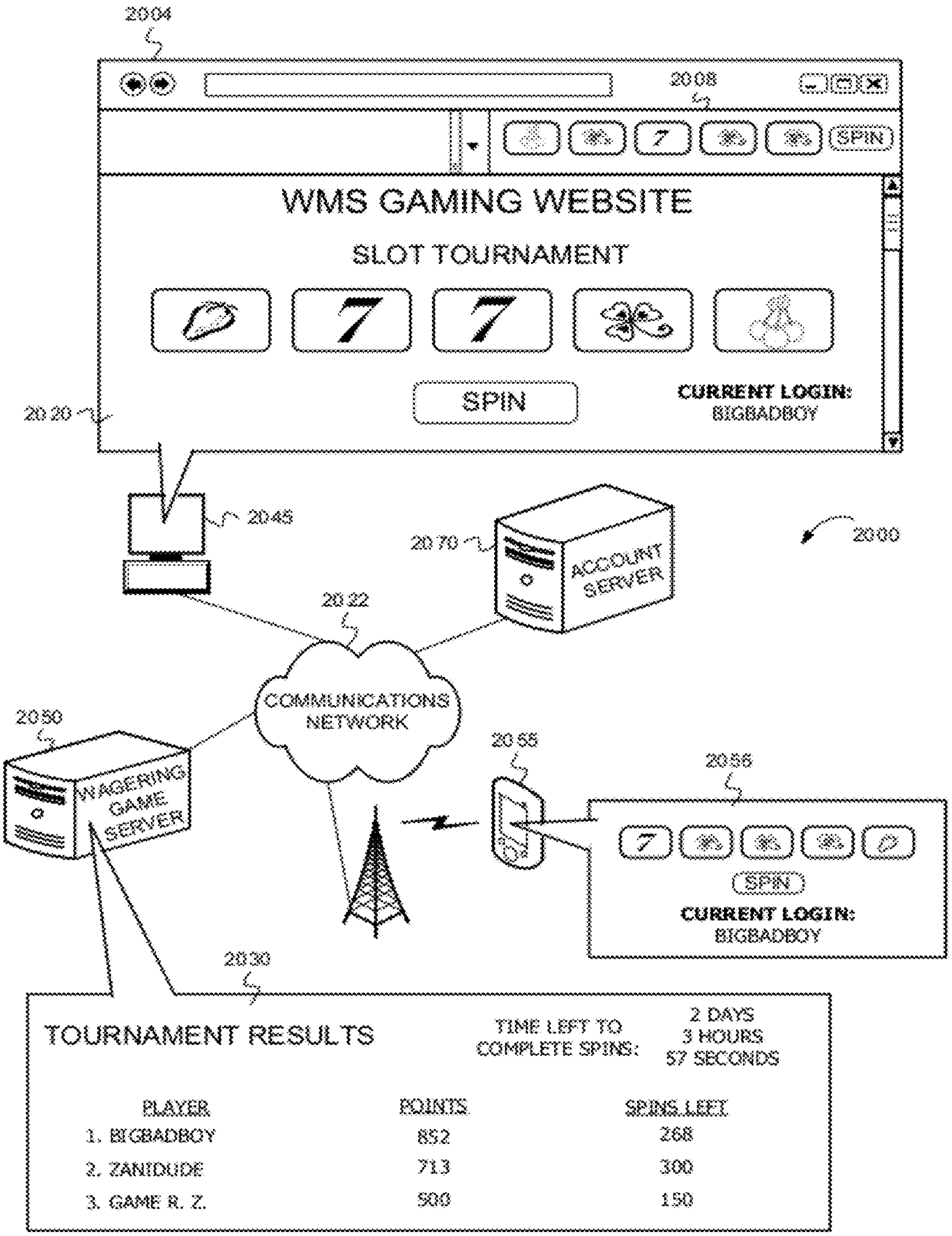
FIG. 20 is an illustration of a wagering game system 2000, according to some embodiments.

FIG. 19 is a flow diagram illustrating processing an online wagering game tournament, according to some embodiments. FIG. 20 is a conceptual diagram that helps illustrate the flow of FIG. 19, according to some embodiments. This description will present FIG. 19 in concert with FIG. 20. In FIG. 19, the flow 1900 begins at processing block 1902, where a wagering game system ("system") accesses a wagering game account and registers the wagering game account in an online wagering game tournament. For example, in FIG. 20, a system includes multiple client devices (e.g., a computer 2045 and a mobile device 2055) connected to a wagering game server 2050 and an account server 2070 via a communications network 2022. In some embodiments, the client devices 2045 and 2055 can be outside of a casino network. The wagering game server 2050 and the account server 2070 can be inside of a casino network. The computer 2045 includes an application program capable of presenting, in an auxiliary display, wagering game information from a wagering game provider. One example of an auxiliary display is a wagering game toolbar 2008 within a browser 2004. The computer 2045 can access an online casino website (e.g., the wagering game server 2050) and present content pertaining to a wagering game tournament within a main display 2020 of the browser 2004. The wagering game server 2050 can determine when a player has logged in to a player account and access the player's account on the account server 2070. The wagering game server 2050 can register the player for the wagering game tournament. The wagering game tournament can require that the player complete a number of wagering games (e.g., complete a minimum number of spins, play a minimum number of hands, etc.) within a specific time period (e.g., a day, a week, etc.) and/or until a specific condition occurs (e.g., until someone hits a point value, until a related event begins or ends, etc.).

The flow 1900 continues at processing block 1904, where the system sends wagering game information to a device outside of a wagering game network to present the wagering game information in an auxiliary display of a network browsing capable application. For example, in FIG. 20, the wagering game server 2050 sends wagering game information to the computer 2045 to display in the browser 2004. The player can begin playing games using the main display 2020 of the browser 2004. When the player navigates away from the online casino website, however, the player can remain connected (e.g., logged in) to the wagering game tournament and continue playing wagering games using the auxiliary display (e.g., the wagering game toolbar 2008) of the browser 2004. If the player has to leave the computer 2045, the player can use the mobile device 2055. The mobile device 2055 can include an application (e.g., a mobile widget 2056), that can present wagering games for the wagering game tournament.

The flow 1900 continues at processing block 1906, where the system receives completion information from the device that the device has processed wagering games using the wagering game information. In FIG. 20, when a player completes a wagering game, the computer 2045 and/or the mobile device 2055 can send completion information to the wagering game server 2050. The wagering game server 2050 tracks that information for the wagering game tournament. The wagering game server 2050 can track the number of games played by any of the devices (e.g., the computer 2045 and the mobile device 2055). In some embodiments, the system 2000 can also determine that a player is playing a wagering game machine within a casino, and can also track plays from the wagering game machine for the wagering game tournament. The system 2000 can determine the time that the wagering games were completed by referencing a system clock for the devices 2045, 2055 and/or a system clock on the wagering game server 2050. The system 2000 notes the time, as well as the wagering game result, to track a score (e.g., points, credits, etc.) earned by the player while playing the wagering games.

The flow 1900 continues at processing block 1908, where the system determines that the device has processed the wagering games within a specified time period for the wagering game tournament. For example, a wagering game "slot" tournament may require five-hundred spins within a week. The wagering game server hosting the "slot" tournament tracks the number of spins and the number of games played. If the player completes the five-hundred spins within the week, then the player is eligible to win the "slot" tournament, along with any other players that have also completed their spin count within the week. The eligible player with the highest score wins the tournament.

The flow 1900 continues at processing block 1910, where the system presents online wagering game tournament statistics for the wagering game account. For example, in FIG. 20, the system 2000 can host a tournament results web page 2030 (e.g., using the wagering game server 2050 and/or other servers not shown). The computer 2045 can access the tournament results web page 2030 and display it within the main display 2020 of the browser 2004. The wagering game toolbar 2008 and the mobile device 2055 can also access and display the tournament results web page 2030. The tournament results web page 2030 can present real-time game statistics for all registered tournament players. The statistics can include the players' names, the number of games played, the scores, a number of games left to play, a clock displaying how much time is left to complete games, etc. After the tournament ends, the tournament results web page 2030 can display winners and awards, viewable via the browser 2004, the wagering game toolbar 2008 and the mobile widget 2056.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method comprising:

presenting first content in a first part of a browser application, wherein the first content indicates information associated with one or more wagering games;

presenting second content in a second part of the browser application concurrently with presenting of the first content in the first part of the browser application, wherein the first part of the browser application is not included in the second part of the browser application, wherein the first part of the browser application is configured to maintain presentation of the first content within the first part of the browser application independent of one or more changes to presentation of the second content within the second part of the browser application, and wherein the first content and second content originate from separate content providers;

determining, via one or more processors, based on concurrent presentation of the first content and the second content, that one or more awards are available from a first of the content providers conditional upon performance of one or more activities indicated by a second of the content providers; and presenting, via at least one of the one or more processors, one or more indicators indicating that the one or more awards are available conditional upon the performance of the one or more activities.

2. The method of claim 1 further comprising:

detecting performance of at least one of the one or more activities via the first content, wherein the first content originates from the first of the content providers;

determining that the second content provider provides at least one of the one or more awards in response to the performance of the at least one of the one or more activities; and providing a compensation from the first content provider to the second content provider in response to determination that the second content provider provides the at least one of the one or more awards.

3. The method of claim 1 further comprising:

detecting performance of at least one of the one or more activities via the second content, wherein the second content originates from the first of the content providers;

determining that the second content provider provides at least one of the one or more awards in response to the performance of the at least one of the one or more activities; and providing a compensation from the first content provider to the second content provider in response to determination that the second content provider provides the at least one of the one or more awards.

4. The method of claim 1, wherein the second part of the browser application includes a main content display of the browser application, and wherein the first part of the browser application is associated with one or more of a toolbar of the browser application, a dropdown of the browser application, a pop-up feature of the browser application, and a web widget presented via the browser application.

5. The method of claim 1, further comprising:

detecting performance of at least one of the one or more activities via the one of more of the first content and the second content; and providing at least one of the one or more awards according to a marketing relationship between the content providers.

6. The method of claim 5, wherein the marketing relationship is one or more of a web-based partnership, a cross-marketing relationship, a referral relationship, an affiliate relationship, a viral marketing relationship, a peer-to-peer relationship, a search engine marketing relationship, an email marketing relationship, and a social networking relationship.

7. The method of claim 1, wherein the one or more activities comprise one or more of creating a player account with the first content provider via the first content, playing a wagering game via the first content in the first part of the browser application, making a purchase from the second content provider via the second content, clicking on a pre-determined number of links within the second content, signing up for an newsletter via the one or more of the first content and the second content, and creating a user account with the second content provider via the second content.

8. The method of claim 1, wherein the determining, based on the concurrent presentation of the first content and the second content, that the one or more awards are available from the first of the content providers conditional upon the performance of the one or more activities via the one or more of the first content and the second content that originates from the second of the content providers comprises one or more of detecting, in response to the concurrent presentation, that the first part of the browser application is pre-configured to determine when a server for the second of the content provider is being accessed, detecting, in response to the concurrent presentation, that a plug-in associated with the first part of the browser application was one or more of created and distributed by the second of the content providers, accessing, in response to the concurrent presentation, a table associated with the first of the content providers wherein the table indicates that a marketing relationship exists with the second of the content providers, detecting, in response to the concurrent presentation, an electronic signal associated with the second content wherein the electronic signal indicates a marketing relationship between the content providers, and detecting, in response to the concurrent presentation, a script embedded within the second content wherein the script indicates a marketing relationship between the content providers.

9. One or more non-transitory machine-readable storage media having instructions stored thereon, which when executed by a set of one or more processors causes the set of one or more processors to perform operations comprising:

presenting first content in a first part of a browser application, wherein the first content indicates information associated with one or more wagering games;

presenting second content in a second part of the browser application concurrently with presenting of the first content in the first part of the browser application, wherein the first part of the browser application is not included in the second part of the browser application, wherein the first part of the browser application is configured to maintain presentation of the first content within the first part of the browser application independent of one or more changes to presentation of the second content within the second part of the browser application, and wherein the first content and second content originate from separate content providers;

determining, based on concurrent presentation of the first content and the second content, that one or more awards are available from a first of the content providers conditional upon performance of one or more activities indicated by a second of the content providers; and presenting, via one or more indicators, an indication that the one or more awards are available conditional upon the performance of the one or more activities.

10. The one or more non-transitory machine-readable storage media of claim 9, said operations further comprising:

detecting performance of at least one of the one or more activities via the first content, wherein the first content originates from the first of the content providers;

determining that the second content provider provides at least one of the one or more awards in response to the performance of the at least one of the one or more activities; and providing a compensation from the first content provider to the second content provider in response to determination that the second content provider provides the at least one of the one or more awards.

11. The one or more non-transitory machine-readable storage media of claim 9, said operations further comprising:

detecting performance of at least one of the one or more activities via the second content, wherein the second content originates from the first of the content providers;

determining that the second content provider provides at least one of the one or more awards in response to the performance of the at least one of the one or more activities; and providing a compensation from the first content provider to the second content provider in response to determination that the second content provider provides the at least one of the one or more awards.

12. The one or more non-transitory machine-readable storage media of claim 9, wherein the second part of the browser application includes a main content display of the browser application, and wherein the first part of the browser application is associated with one or more of a toolbar of the browser application, a dropdown of the browser application, a pop-up feature of the browser application, and a web widget presented via the browser application.

13. The one or more non-transitory machine-readable storage media of claim 9, said operations further comprising:

detecting performance of at least one of the one or more activities via the one of more of the first content and the second content; and providing at least one of the one or more awards according to a marketing relationship between the content providers.

14. The one or more non-transitory machine-readable storage media of claim 9, wherein the operation for determining, based on the concurrent presentation of the first content and the second content, that the one or more awards are available from the first of the content providers conditional upon the performance of the one or more activities via the one or more of the first content and the second content that originates from the second of the content providers includes one or more an operation for detecting, in response to the concurrent presentation, that the first part of the browser application is pre-configured to determine when a server for the second of the content provider is being accessed, an operation for detecting, in response to the concurrent presentation, that a plug-in associated with the first part of the browser application was one or more of created and distributed by the second of the content providers, an operation for accessing, in response to the concurrent presentation, a table associated with the first of the content providers wherein the table indicates that a marketing relationship exists with the second of the content providers, an operation for detecting, in response to the concurrent presentation, an electronic signal associated with the second content wherein the electronic signal indicates a marketing relationship between the content providers, and an operation for detecting, in response to the concurrent presentation, a script embedded within the second content wherein the script indicates a marketing relationship between the content providers.

15. A system comprising:

at least one processor; and at least one memory device configured to store instructions which, when executed by the at least one processor, cause the system to, present first content in a first part of a browser application, wherein the first content indicates information associated with one or more wagering games, present second content in a second part of the browser application concurrently with presentation of the first content in the first part of the browser application, wherein the first part of the browser application is not included in the second part of the browser application, wherein the first part of the browser application is configured to maintain presentation of the first content within the first part of the browser application independent of one or more changes to presentation of the second content within the second part of the browser application, and wherein the first content and second content originate from separate content providers, determine, based on concurrent presentation of the first content and the second content, that one or more awards are available from a first of the content providers conditional upon performance of one or more activities indicated by a second of the content providers, and present, via one or more indicators, an indication that the one or more awards are available conditional upon the performance of the one or more activities.

16. The system of claim 15, wherein the instructions, when executed by the at least one processor, further cause the system to, detect performance of at least one of the one or more activities via the first content, wherein the first content originates from the first of the content providers, determine that the second content provider provides at least one of the one or more awards in response to the performance of the at least one of the one or more activities, and provide a compensation from the first content provider to the second content provider in response to determination that the second content provider provides the at least one of the one or more awards.

17. The system of claim 15, wherein the instructions, when executed by the at least one processor, further cause the system to, detect performance of at least one of the one or more activities via the second content, wherein the second content originates from the first of the content providers, determine that the second content provider provides at least one of the one or more awards in response to the performance of the at least one of the one or more activities, and provide a compensation from the first content provider to the second content provider in response to determination that the second content provider provides the at least one of the one or more awards.

18. The system of claim 15, wherein the second part of the browser application includes a main content display of the browser application, and wherein the first part of the browser application is associated with one or more of a toolbar of the browser application, a dropdown of the browser application, a pop-up feature of the browser application, and a web widget presented via the browser application.

19. The system of claim 15, wherein the instructions, when executed by the at least one processor, further cause the system to, detect performance of at least one of the one or more activities via the one of more of the first content and the second content, and provide at least one of the one or more awards according to a marketing relationship between the content providers.

20. The system of claim 15, wherein the instruction to determine, based on the concurrent presentation of the first content and the second content, that the one or more awards are available from the first of the content providers conditional upon the performance of the one or more activities via the one or more of the first content and the second content that originates from the second of the content providers comprises one or more of an instruction to detect, in response to the concurrent presentation, that the first part of the browser application is pre-configured to determine when a server for the second of the content provider is being accessed, an instruction to detect, in response to the concurrent presentation, that a plug-in associated with the first part of the browser application was one or more of created and distributed by the second of the content providers, an instruction to access, in response to the concurrent presentation, a table associated with the first of the content providers wherein the table indicates that a marketing relationship exists with the second of the content providers, an instruction to detect, in response to the concurrent presentation, an electronic signal associated with the second content wherein the electronic signal indicates a marketing relationship between the content providers, and an instruction to detect, in response to the concurrent presentation, a script embedded within the second content wherein the script indicates a marketing relationship between the content providers.

21. An apparatus comprising:

at least one processor; and at least one memory device configured to store instructions which, when executed by the at least one processor, cause the apparatus to:

present first content in a first part of a browser application, wherein the first content indicates information associated with one or more wagering games, and wherein the first part of the browser application is associated with one or more of a toolbar of the browser application, a dropdown of the browser application, a pop-up feature of the browser application, and a web widget presented via the browser application, present second content in a second part of the browser application concurrently with presentation of the first content in the first part of the browser application, wherein the first part of the browser application is not included in the second part of the browser application, wherein the first part of the browser application is configured to maintain presentation of the first content within the first part of the browser application independent of one or more changes to presentation of the second content within the second part of the browser application, and wherein the first content and second content originate from separate content providers, determine, based on concurrent presentation of the first content and the second content, that one or more awards are available from a first of the content providers conditional upon performance of one or more activities indicated by a second of the content providers, and present, via one or more indicators, an indication that the one or more awards are available conditional upon the performance of the one or more activities.

22. The apparatus of claim 21, wherein the instructions, when executed by the at least one processor, further cause the apparatus to, detect performance of at least one of the one or more activities via the first content, wherein the first content originates from the first of the content providers, determine that the second content provider provides at least one of the one or more awards in response to the performance of the at least one of the one or more activities, and provide a compensation from the first content provider to the second content provider in response to determination that the second content provider provides the at least one of the one or more awards.

23. The apparatus of claim 21, wherein the instructions, when executed by the at least one processor, further cause the apparatus to, detect performance of at least one of the one or more activities via the second content, wherein the second content originates from the first of the content providers, determine that the second content provider provides at least one of the one or more awards in response to the performance of the at least one of the one or more activities, and provide a compensation from the first content provider to the second content provider in response to determination that the second content provider provides the at least one of the one or more awards.

24. The apparatus of claim 21, wherein the instructions, when executed by the at least one processor, further cause the apparatus to, detect performance of at least one of the one or more activities via the one of more of the first content and the second content, and provide at least one of the one or more awards according to a marketing relationship between the content providers.

25. The apparatus of claim 21, wherein the instruction to determine, based on the concurrent presentation of the first content and the second content, that the one or more awards are available from the first of the content providers conditional upon the performance of the one or more activities via the one or more of the first content and the second content that originates from the second of the content providers comprises one or more of an instruction to detect, in response to the concurrent presentation, that the first part of the browser application is pre-configured to determine when a server for the second of the content provider is being accessed, an instruction to detect, in response to the concurrent presentation, that a plug-in associated with the first part of the browser application was one or more of created and distributed by the second of the content providers, an instruction to access, in response to the concurrent presentation, a table associated with the first of the content providers wherein the table indicates that a marketing relationship exists with the second of the content providers, an instruction to detect, in response to the concurrent presentation, an electronic signal associated with the second content wherein the electronic signal indicates a marketing relationship between the content providers, and an instruction to detect, in response to the concurrent presentation, a script embedded within the second content wherein the script indicates a marketing relationship between the content providers.

26. An apparatus comprising:

means for presenting first content in a first part of a browser application, wherein the first content indicates information associated with one or more wagering games;

means for presenting second content in a second part of the browser application concurrently with presenting of the first content in the first part of the browser application, wherein the first part of the browser application is not included in a main content display of the second part of the browser application, wherein the first part of the browser application is configured to maintain presentation of the first content within the first part of the browser application independent of one or more changes to presentation of the second content within the second part of the browser application, and wherein the first content and second content originate from separate content providers;

means for determining, based on concurrent presentation of the first content and the second content, that one or more awards are available from a first of the content providers conditional upon performance of one or more activities indicated by a second of the content providers;

means for presenting, via one or more indicators, an indication that the one or more awards are available conditional upon the performance of the one or more activities;

means for detecting performance of at least one of the one or more activities via the one of more of the first content and the second content; and means for providing at least one of the one or more awards according to a marketing relationship between the content providers.

27. The apparatus of claim 26, wherein the first part of the browser application is associated with one or more of a toolbar of the browser application, a dropdown of the browser application, a pop-up feature of the browser application, and a web widget presented via the browser application.

28. The apparatus of claim 26 further comprising:

means for detecting performance of at least one of the one or more activities via the first content, wherein the first content originates from the first of the content providers;

means for determining that the second content provider provides at least one of the one or more awards in response to the performance of the at least one of the one or more activities; and means for providing a compensation from the first content provider to the second content provider according to the marketing relationship in response to determination that the second content provider provides the at least one of the one or more awards.

29. The apparatus of claim 26 further comprising:

means for detecting performance of at least one of the one or more activities via the second content, wherein the second content originates from the first of the content providers;

means for determining that the second content provider provides at least one of the one or more awards in response to the performance of the at least one of the one or more activities; and means for providing a compensation from the first content provider to the second content provider according to the marketing relationship in response to determination that the second content provider provides the at least one of the one or more awards.

30. The apparatus of claim 26, wherein the marketing relationship is one or more of a web-based partnership, a cross-marketing relationship, a referral relationship, an affiliate relationship, a viral marketing relationship, a peer-to-peer relationship, a search engine marketing relationship, an email marketing relationship, and a social networking relationship.

31. The apparatus of claim 26, wherein the means for determining, based on the concurrent presentation of the first content and the second content, that the one or more awards are available from the first of the content providers conditional upon the performance of the one or more activities via the one or more of the first content and the second content that originates from the second of the content providers comprises one or more of means for detecting, in response to the concurrent presentation, that the first part of the browser application is pre-configured to determine when a server for the second of the content provider is being accessed, means for detecting, in response to the concurrent presentation, that a plug-in associated with the first part of the browser application was one or more of created and distributed by the second of the content providers, means for accessing, in response to the concurrent presentation, a table associated with the first of the content providers wherein the table indicates that the marketing relationship exists with the second of the content providers, means for detecting, in response to the concurrent presentation, an electronic signal associated with the second content wherein the electronic signal indicates the marketing relationship between the content providers, and means for detecting, in response to the concurrent presentation, a script embedded within the second content wherein the script indicates the marketing relationship between the content providers.

* * * * *